United States Patent
Yoshimoto et al.

(10) Patent No.: US 8,971,265 B2
(45) Date of Patent: Mar. 3, 2015

(54) COMMUNICATION SYSTEM, COMMUNICATION METHOD AND BASE STATION

(75) Inventors: Takashi Yoshimoto, Osaka (JP); Kazuyuki Shimezawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 270 days.

(21) Appl. No.: 13/388,895

(22) PCT Filed: Aug. 4, 2010

(86) PCT No.: PCT/JP2010/063195
§ 371 (c)(1),
(2), (4) Date: Feb. 3, 2012

(87) PCT Pub. No.: WO2011/016489
PCT Pub. Date: Feb. 10, 2011

(65) Prior Publication Data
US 2012/0127949 A1    May 24, 2012

(30) Foreign Application Priority Data
Aug. 6, 2009  (JP) .................. 2009-183795

(51) Int. Cl.
| H04W 4/00 | (2009.01) |
| H04J 3/14 | (2006.01) |
| H04B 7/216 | (2006.01) |
| H04W 36/00 | (2009.01) |

(Continued)

(52) U.S. Cl.
CPC ........... *H04J 11/0053* (2013.01); *H04L 5/0007* (2013.01); *H04L 5/0035* (2013.01); *H04L 5/0073* (2013.01); *H04L 27/2607* (2013.01); *H04L 1/0045* (2013.01); *H04L 1/0077* (2013.01); *H04L 1/0068* (2013.01)
USPC ........... 370/329; 370/328; 370/242; 370/335; 455/438

(58) Field of Classification Search
CPC ...................................................... H04W 28/04
USPC ................... 370/328, 329, 242, 335; 455/438
See application file for complete search history.

(56) References Cited

U.S. PATENT DOCUMENTS 6,320,852 B1 * 11/2001 Obuchi et al. ................. 370/328
8,634,404 B2    1/2014 Morimoto et al.

(Continued)

FOREIGN PATENT DOCUMENTS

| EP | 0 954 192 A1 | 11/1999 |
| JP | 11-313357 A | 11/1999 |

(Continued)

*Primary Examiner* — Kiet Tang
(74) *Attorney, Agent, or Firm* — Birch, Stewart, Kolasch & Birch, LLP

(57) ABSTRACT

In a communication system including a mobile station that transmits a data signal and a plurality of base stations receiving the data signal transmitted by the mobile station, the communication system includes: as the base stations, at least, one first base station having a first signal detector detecting the data signal transmitted by the mobile station; and, at least, one second base station having a second signal detector that detects the data signal received by the station per se, using the detection result which the first base station has detected from the data signal transmitted by the mobile station. As a result, it is possible to provide a communication system and the like capable of providing good transmission characteristics in the uplink cooperative communication without addition of CPs having a longer length than usual.

19 Claims, 25 Drawing Sheets

(51) Int. Cl.
*H04J 11/00* (2006.01)
*H04L 5/00* (2006.01)
*H04L 27/26* (2006.01)
*H04L 1/00* (2006.01)

(56) References Cited

U.S. PATENT DOCUMENTS

| | | |
|---|---|---|
| 2003/0117964 A1 | 6/2003 | Chen et al. |
| 2006/0111137 A1 | 5/2006 | Mori et al. |
| 2008/0037474 A1* | 2/2008 | Niwano ................. 370/335 |
| 2009/0238126 A1* | 9/2009 | Sato et al. .................. 370/329 |
| 2009/0247168 A1 | 10/2009 | Morimoto et al. |
| 2009/0323603 A1* | 12/2009 | Kwon et al. ................. 370/329 |
| 2010/0157906 A1* | 6/2010 | Yang et al. .................. 370/328 |
| 2010/0279695 A1* | 11/2010 | Amirijoo et al. ............. 455/438 |
| 2010/0322080 A1* | 12/2010 | Sung et al. ................... 370/242 |
| 2014/0098800 A1 | 4/2014 | Morimoto et al. |

FOREIGN PATENT DOCUMENTS

| | | |
|---|---|---|
| JP | 2003-199144 A | 7/2003 |
| JP | 2004-221702 A | 8/2004 |
| JP | 2006-135673 A | 5/2006 |
| JP | 2007-60177 A | 3/2007 |
| WO | WO 2009/075231 A1 | 5/2006 |

* cited by examiner

COMMUNICATION SYSTEM, COMMUNICATION METHOD AND BASE STATION

TECHNICAL FIELD

The present invention relates to a communication system including a mobile station transmitting a data signal and a plurality of base stations receiving the data signal transmitted by the mobile station.

BACKGROUND ART

In mobile radio communication system, a plurality of base stations (eNodeB) are arranged so as to cover a communication area like cells, forming a cellular structure to thereby making it possible to enlarge the communication area (which is called a cellular system). A mobile station (mobile terminal, UE (User Equipment)) usually selects one base station which is good in communication quality (channel condition) and connects to that base station.

In uplink, it is necessary for a base station to make the arrival times of the data signals transmitted from a plurality of mobile stations that have selected to connect to the base station per se, put within a predetermined time range. For example, in a mobile radio communication system such as LTE (Long Term Evolution), LTE-Advanced using OFDMA (Orthogonal Frequency Division Multiple Access), SC-FDMA (Single Carrier-Frequency Division Multiple Access), DFT-spread OFDM (Discrete Fourier Transform-spread Orthogonal Frequency Division Multiplexing) or DFT-precoded OFDM (Discrete Fourier Transform-precoded Orthogonal Frequency Division Multiplexing), the time differences in arrival of data signals from different mobile stations at the base station may be made to fall within the length of CP (Cyclic Prefix) to thereby suppress inter-symbol interference and inter-carrier interference due to time difference of arrival.

The CP is a guard interval that is added to precede the valid symbol in order to avoid influence of multipath fading in a multicarrier transmission such as OFDM transmission, and is a guard interval that is added to precede the OFDMA symbol or SC-FDMA symbol in the aforementioned OFDMA and SC-FDMA.

In these communication schemes, multiple access between mobile stations can be carried out based on sections (e.g., resource blocks) into which the resource is divided with respect to the frequency domain and time domain. Accordingly, in uplink, the propagation distance of each mobile station to the base station becomes different depending on the relative position between the base station and mobile station.

FIG. 24 shows an example when a mobile station 1000-1 and mobile station 1000-2 make choice of connection to a base station 2000 while mobile station 1000-3 and mobile station 1000-4 make choice of connection to a base station 3000, where $t_{12}$ is the time of arrival of the signal transmitted by mobile station 1000-1 at base station 2000, $t_{22}$ is the time of arrival of the signal transmitted by mobile station 1000-2 at base station 2000, $t_{33}$ is the time of arrival of the signal transmitted by mobile station 1000-3 at base station 3000, and $t_{43}$ is the time of arrival of the signal transmitted by mobile station 1000-4 at base station 3000.

When the length of the CPs added to the data signals transmitted to base station 2000 by mobile station 1000-1 and 1000-2 is tcp, base station 2000 transmits a control signal (timing adjustment signal, Timing Advance command) that informs the data signal transmission timing satisfying $|t_{12}-t_{22}|<tcp$, to each mobile station, and each mobile station transmits its data signal to base station 2000, based on that transmission timing.

In this case, it is preferable that the transmission timing of each mobile station is controlled so that the data signals the different mobile station transmit, simultaneously arrive at base station 2000. Here, |x| indicates the absolute value of x.

Similarly, mobile station 1000-3 and mobile station 1000-4 transmit respective data signals to base station 3000 at timings that satisfy $|t_{33}-t_{43}|<tcp$. This transmission timing control is performed for each mobile station so that the base station can receive data signals transmitted from different mobile stations simultaneously, to thereby avoid interference between mobile stations.

Here, a base station manager 10 is an apparatus that manages base station 2000 and base station 3000, and is connected to the base stations by wired networks, etc. This apparatus has the functions of, for example, control for performing cooperative communication between base stations, handover control and others. Here, base station 2000 and/or base station 3000 may have the function of base station manager 10.

In a cellular system of this kind, it is possible for a mobile station located at the cell-edge area to perform communication without being affected by interference from the adjacent cell, by using different frequencies between adjacent cells (sectors). However, this entails the problem that frequency use efficiency degrades. To deal with this, by making use of an identical frequency iteratively in different cells (sectors) it is possible to sharply improve frequency use efficiency, but it is necessary to take a measure against interference from the adjacent cell with mobile stations located at the cell-edge area. Further, since mobile stations are limited as to transmission power hence the level of power of signals reaching the base station when the mobile station is located at the cell-edge area, is low, the communication results in a low-data rate.

Under such circumstances, methods of mitigating or suppressing interference with mobile stations located at the cell-edge area by performing inter-cell cooperative communication, i.e., cooperation between neighboring cells, and methods of compensating for the power level of arrival signals, have been investigated. As an example of such a scheme, CoPM (Cooperative Multipoint) transmission scheme and the like have been discussed in a non-patent document 1.

FIG. 25 is a diagram showing one example of a CoMP transmission scheme in uplink, in which a mobile station 100-1 located at the cell-edge area is performing cooperative communication. Mobile station 100-1 is a mobile station that performs cooperative communication with a base station 200 and base station 300. Here, $t'_{12}$ is the time at which the signal transmitted by mobile station 100-1 reaches base station 200 and $t'_{13}$ is the time at which the signal transmitted by mobile station 100-1 reaches base station 300.

Here, mobile station 100-2 is a mobile station that communicates with base station 200 only ($t'_{22}$ is the time at which the signal transmitted by mobile station 100-2 reaches base station 200), and mobile station 100-3 is a mobile station that communicates with base station 300 only ($t'_{33}$ is the time at which the signal transmitted by mobile station 100-3 reaches base station 300).

Mobile station 100-1 transmits the same data signal to both base station 200 and base station 300. Base station 300 transmits the data signal received from mobile station 100-1 to base station 200 by way of a wired line such as an optical fiber or the like (e.g., the X2 interface in LTE) while base station 200 performs a signal detecting process such as a decoding process and the like, using the data signal directly received from mobile station 100-1 and the data signal of mobile station 100-1 transmitted by way of base station 300.

As a result the data signal transmitted by mobile station 100-1 can be reduced in inter-cell interference and increased in signal power at the time of data signal detection, by resource allocation scheduling and site diversity effect based on the traffic conditions (cell environment) of both base station 200 and base station 300, hence making it possible to improve the transmission characteristics of the mobile station located at the cell-edge area.

Meanwhile, the base station that performs various sorts of controls for communication on a mobile station that is transmitting a data signal to a plurality of base stations is called an anchor base station whereas the base stations other than this are called cooperative base stations. Here, the anchor base station may be defined as a base station that transmits downlink control signals (DCI: Downlink Control Information) through the PDCCH (Physical Downlink Control CHannel).

However, in the uplink inter-cell cooperative communication as above, there occur cases in which $|t'_{12}-t'_{22}|<tcp$ and $|t'_{13}-t'_{33}|<tcp$ cannot hold simultaneously, due to difference between the channel condition between mobile station 100-1 and base station 200 and the channel condition between mobile station 100-1 and base station 300.

For example, when the timing of data signal transmission from mobile station 100-1 is set based on the channel condition between mobile station 100-1 and base station 200, it is possible to make the time difference of arrival between mobile station 100-1 and mobile station 100-2, both connecting to base station 200, fall within a time range equal to or shorter than the CP length. However, since the above transmission timing is not set by taking the channel condition between mobile station 100-1 and base station 300 into consideration, there occur cases where the time difference of arrival at base station 300 between the data signal from mobile station 100-1 and the data signal from mobile station 100-3 is equal to or greater than the CP length. As a result, in OFDM transmission, there has been the problem of characteristics degradation due to inter-symbol interference and inter-carrier interference. Further, in SC-FDMA transmission, there occur characteristics degradation attributed to collapse of the periodicity of the FFT (DFT) and characteristics degradation attributed to interference between signals in the FFT duration (inter block interference).

To deal with this problem, in order to avoid the problem as to the above delay, non-patent document 2 discloses a new transmission timing control method on the basis of cooperative communication and a method of making the CP length longer. With this scheme, the time difference of arrival is made to fall within the CP length to thereby suppress interference.

PRIOR ART DOCUMENTS

Non-Patent Document

Non-Patent Document 1: 3rd Generation Partnership Project; Technical Specification Group Radio Access Network; Further Advancements for E-UTRA Physical Layer Aspects (Release 9), 3GPP TR 36.814 V1.1.1 (2009-06), June, 2009.
Non-Patent Document 2: Huawei, "System modeling and performance evaluation for uplink CoMP considering delay spread issue, "3GPP R1-092368, TSG RAN WG1 Meeting #57bis, Los Angeles, Calif. USA, June 2009.

SUMMARY OF THE INVENTION

Problems to be Solved by the Invention

However, since, in non-patent document 2, CPs that are longer than usual are used for cooperative communication, the method entails the problem that CP insertion loss increases and hence transmission efficiency lowers. The method further poses a lowering transmission efficiency problem and complicated control problem due to addition of control signals accompanied by switching of the CP length.

The present invention has been devised in view of the above circumstances, it is therefore an object of the present invention to provide a communication system and the like which can exhibit good transmission characteristics without adding CPs having a longer CP length than usual, in uplink cooperative communication.

Means for Solving the Problems

In order to solve the above problems, the communication system aimed at the present invention is a communication system comprising a mobile station that transmits a data signal and a plurality of base stations receiving the data signal transmitted by the mobile station, characterized in that in that the communication system includes: as the base stations, at least, one first base station having a first signal detector detecting the data signal transmitted by the mobile station; and, at least, one second base station having a second signal detector that detects the data signal transmitted by the mobile station, using a detection result which the first base station has detected from the data signal transmitted by the mobile station.

The communication system of the present invention is characterized in that the second signal detector removes the data signal transmitted by the mobile station, from the data signals received by the second base station, using the detection result detected by the first base station.

The communication system of the present invention is characterized in that the second base station further comprises a decoder that performs a decoding process on the detection result which the second signal detector has detected from the data signal transmitted by the mobile station, and the second signal detector, using a result of the decoding process, performs detection of the data signal transmitted by the mobile station.

The communication system of the present invention is characterized in that the first base station further comprises a combiner that combines a result which the first signal detector has detected from the data signal transmitted by the mobile station and a result which the second signal detector has detected from the data signal transmitted by the mobile station.

The communication system of the present invention is characterized in that the second base station further comprises a combiner that combines a result which the first signal detector has detected from the data signal transmitted by the mobile station and a result which the second signal detector has detected from the data signal transmitted by the mobile station.

The communication system of the present invention is characterized in that the mobile station transmits a transmission timing measurement signal for measuring a timing at which the station per se will transmit a data signal, to the first base station and the second base station.

The communication system of the present invention is characterized in that the first base station includes: a control signal generator that generates offset information on a timing at which the mobile station transmits a data signal, based on a reference timing which the first base station holds; and a radio unit for transmitting a control signal including the offset information with respect to the timing, and, the mobile station transmits a data signal in accordance with a resource allocation information based on the transmission timing offset information notified by the control signal.

The communication system of the present invention is characterized in that the second base station determines whether or not the timing at which the data signal transmitted by the mobile station using the resource allocation information falls beyond the GI length.

The communication system of the present invention is characterized in that the second base station requests the first base station to transmit a detected result of the data signal transmitted by the mobile station.

The communication system of the present invention is characterized in that the second base station includes: a control signal generator that generates offset information on a timing at which the mobile station transmits a data signal, based on a reference timing which the first base station holds; and a radio unit for transmitting a control signal including the offset information with respect to the timing, and, the mobile station transmits a data signal in accordance with a resource allocation information based on the transmission timing offset information notified by the control signal.

The communication system of the present invention is characterized in that the second base station determines whether or not the timing at which the data signal transmitted by the mobile station using the resource allocation information falls beyond the GI length.

The communication system of the present invention is characterized in that the second base station requests the first base station to transmit a detected result of the data signal transmitted by the mobile station.

The communication system of the present invention is characterized in that the first base station further comprises: a decoder that performs a decoding process on a result detected by the first signal detector; and an upper layer that transmits the result of the decoding process by the decoder, or the result of the decoding process on the data signal transmitted by the mobile station, to the second base station.

The communication system of the present invention is characterized in that the second signal detector further includes: a replica generator that generates a received signal replica of the data signal of the mobile station which the station per se has received, from the detection result which the first base station has detected from the data signal transmitted by the mobile station; and, an interference canceller that subtracts the received signal replica from the data signal.

The communication system of the present invention is characterized in that the second signal detector further includes: a replica generator that generates a received signal replica of the data signal of communication apparatus other than the mobile station, received by the station per se, from the result of the decoding process of the decoder; and, an interference canceller that subtracts the received signal replicas from the data signal.

The communication method of the present invention is a communication method for use in a communication system comprising a mobile station that transmits a data signal and at least first and second base stations receiving the data signal transmitted by the mobile station, causing the first base station to perform the steps of: detecting the data signal transmitted by the mobile station; and, performing detection of the data signal received by the station per se, using a detection result which the first base station has detected from the data signal transmitted by the mobile station.

The base station of the present invention is a base station connected to a communication system comprising a mobile station that transmits a data signal and another base station including a first signal detector for detecting the data signal transmitted by the mobile station, characterized in that the other base station has a second signal detector that detects the data signal received by the station per se, using a detection result which the first base station has detected from the data signal transmitted by the mobile station.

Advantages of the Invention

In the communication system of the present embodiment, when a mobile station transmits an identical data signal to a plurality of base stations, a base station having received the identical data signal detects the identical data signal, using the result of signal detection at another base station having received the identical data signal. Accordingly, even when the reception timing of the signal from the mobile station transmitting the identical data signal becomes greater in excess of the GI length relative to the reception timing of a signal from another mobile station, it is possible to suppress interference between reception signals from mobile stations due to reception timings, hence reduce characteristics degradation without using longer CPs.

MODE FOR CARRYING OUT THE INVENTION

Now, the most preferable modes for carrying out the present invention will be described with reference to the drawings. The communication system of the present invention includes a mobile station that transmits an identical data signal to a plurality of base stations on the uplink while the plurality of base stations cooperatively perform a detection process of the data signal of the mobile station. The mobile station that transmits an identical data signal to the plurality of base stations is called a cooperative mobile station.

1. The First Embodiment

Figure 25:
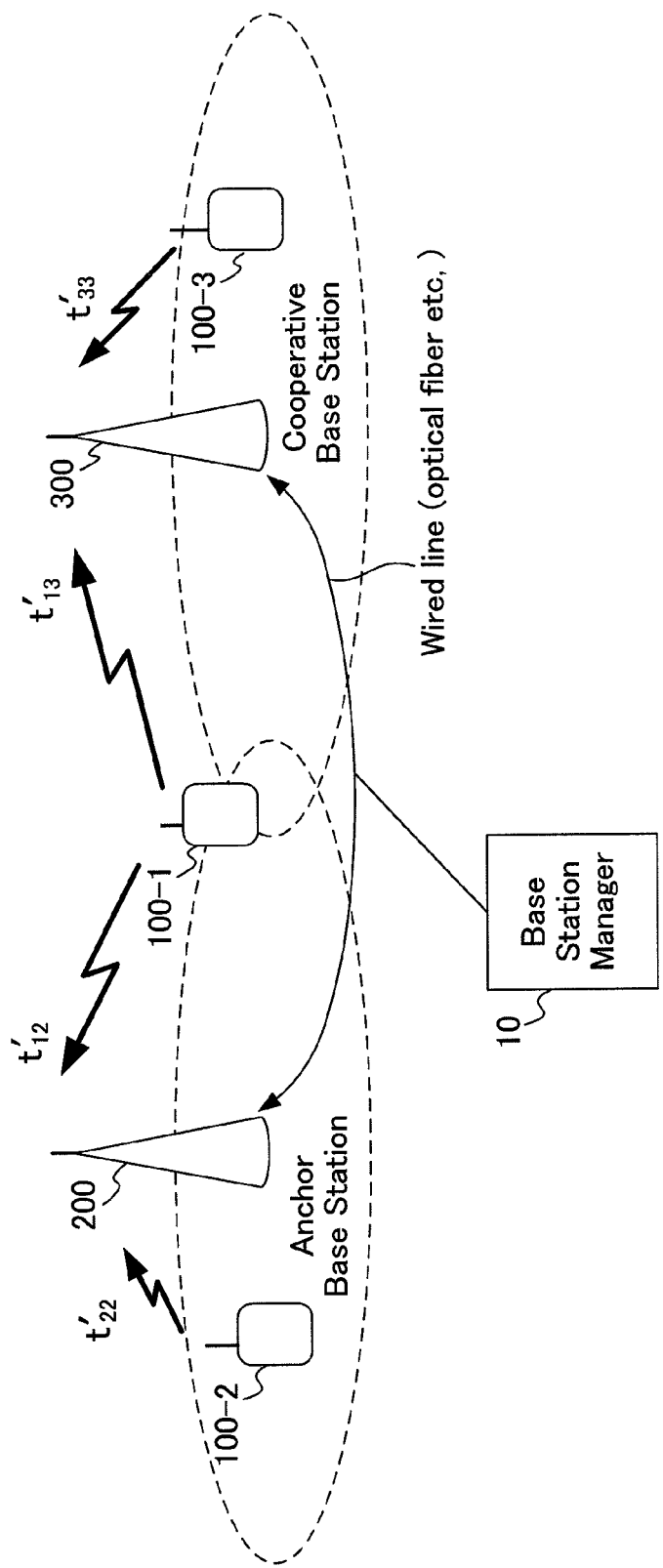
FIG. 25 is a diagram for illustrating a communication system as a whole.

The first embodiment presents a case of a communication system in which a mobile station (mobile terminal) transmits an identical data signal to a single anchor base station (serving base station, Service cell) and a cooperative base station, and the timing at which the mobile station transmits is designated based on the reference timing of the anchor base station. Description hereinafter will be given on a case where three mobile stations $100\text{-}n$ ($n=1$, 2 and 3) exist in the cells formed by two base stations (base stations 200 and 300) shown in FIG. 25, and one mobile station 100-1 among the aforementioned mobile stations, transmits a data signal to both the base stations. Further, the description hereinbelow will be made taking a case using SC-FDMA as a transmission scheme, but the embodiment should not be limited to this.

[1.1 The Configuration of Mobile Stations]

Figure 1:
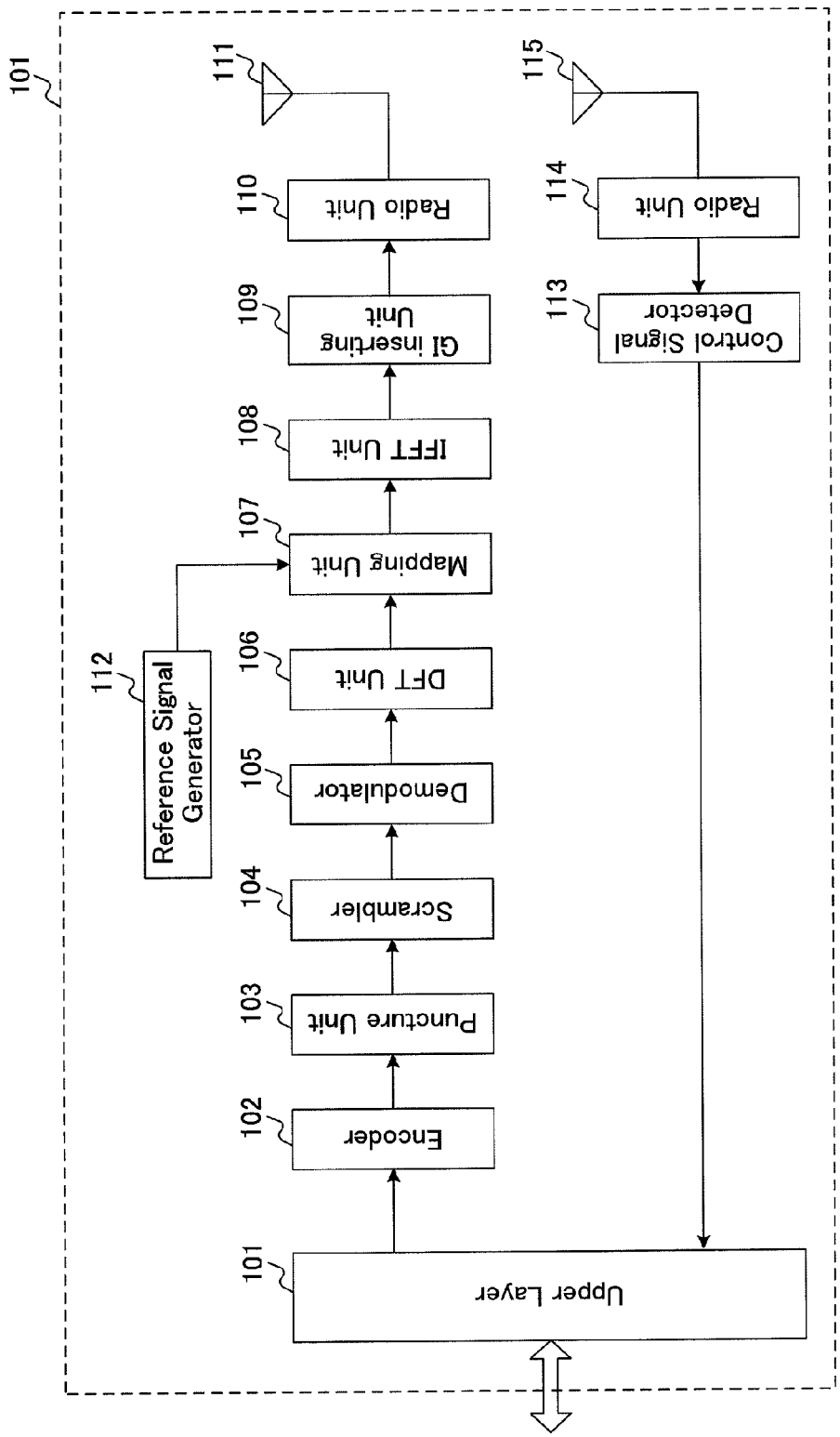
FIG. 1 is a diagram for illustrating a configuration of a mobile station in the first embodiment.

FIG. 1 is a schematic block diagram showing a configuration of mobile station $100\text{-}n$ in the first embodiment. Mobile station $100\text{-}n$ includes an upper layer 101, an encoder 102, a puncture unit 103, a scrambler 104, a modulator 105, a DFT unit 106, a mapping unit 107, an IFFT unit 108, a GI inserting unit (CP inserter) 109, a radio unit 110, a transmitting antenna unit 111, a reference signal generator 112, a control signal detector 113, a radio unit 114 and a receiving antenna unit 115.

Upper layer 101 is a unit having functions belonging to the upper layers such as a MAC (Media Access Control) layer, a network layer and the like and supplies information data and/or control data to be transmitted on the uplink to encoder 102.

Encoder 102 encodes the input data, using an error correction code such as a convolutional code, turbo code, LDPC (Low Density Parity Check) code or the like, to generate coded bits.

Puncture unit 103 performs a puncture process on the coded bits output from encoder 102, in accordance with the MCS (Modulation and Coding Scheme) of the signal transmitted by mobile station $100\text{-}n$. Here, the puncture process may be different depending on each destination (individual base station).

Scrambler 104 performs a scrambling process by multiplying the signal output from puncture unit 103 with a data sequence unique to the mobile station. Here, the data sequence is preferably a pseudo noise sequence.

Modulator 105 maps the signal output from scrambler 104 to modulation symbols based on PSK (Phase Shift Keying), QAM (Quadrature Amplitude Modulation) or the like.

DFT unit 106 performs a DFT process (discrete Fourier transform process) on the modulation symbols output from modulator 105.

Mapping unit 107 maps the output signal from DFT unit 106 and the reference signal generated by reference signal generator 112 to the determined resources (resource elements), and the mapped signal is frequency-time transformed by IFFT unit 108.

Here, the resource is a unit formed of a single subcarrier and a single SC-FDMA symbol in the frame which mobile station $100\text{-}n$ transmits, the unit to which the output signal from DFT unit 106 and the reference signal are allotted. The aforementioned reference signal is a signal to be used for channel estimation, and is a known signal under the communication system. Here, the reference signal may be different depending on usage. For example, the reference signal for channel condition measurement (SRS: Sounding Reference Signal) for performing resource allocation scheduling on the uplink, the demodulation reference signal (DMRS: Demodulation Reference Signal) for demodulating the data signal transmitted by the mobile station at the base station, or the like may be used. It is noted that the demodulation reference signal can be inserted into the signal before DFT unit 106.

GI inserting unit 109 adds guard intervals to the time signal generated by IFFT unit 108. The signal output from GI inserting unit 109 is supplied to radio unit 110 where the signal is digital-to-analog (D/A) converted, shaped in waveform by a transmission filter and converted into the radio frequency, to be transmitted from transmitting antenna unit 111. Here, the signal output from GI inserting unit 109, i.e., the duration output by the IFFT unit 108 together with the GI duration added by the GI inserting unit 109 is called a SC-FDMA symbol.

Receiving antenna 115 unit receives the signal transmitted by a base station, and the signal is converted from the radio frequency to the baseband by radio unit 114, subjected to band limitation of a receiving filter, and analog-to-digital converted (A/D converted) so as to be output as a received signal.

Control signal detector 113 detects the control signal from the received signal and notifies control information to upper layer 101. The control information includes transmission timing information (Timing Advance Command) on the uplink. Mobile station 100-1 (cooperative mobile station) receives a control signal including the transmission timing information from base station 200 (anchor base station, which will be described later). Mobile station 100-2 receives a control signal including the transmission timing information from base station 200. Mobile station 100-3 receives a control signal including the transmission timing information from base station 300.

Here, as many series of scrambler 104, modulator 105, DFT unit 106, mapping unit 107, IFFT unit 108, GI inserting unit 109, radio unit 110 and transmitting antenna unit 111 as the number of the base stations to which mobile station $100\text{-}n$ connects may be provided.

[1.2 The Configuration of Base Station (Anchor Base Station)]

Figure 2:
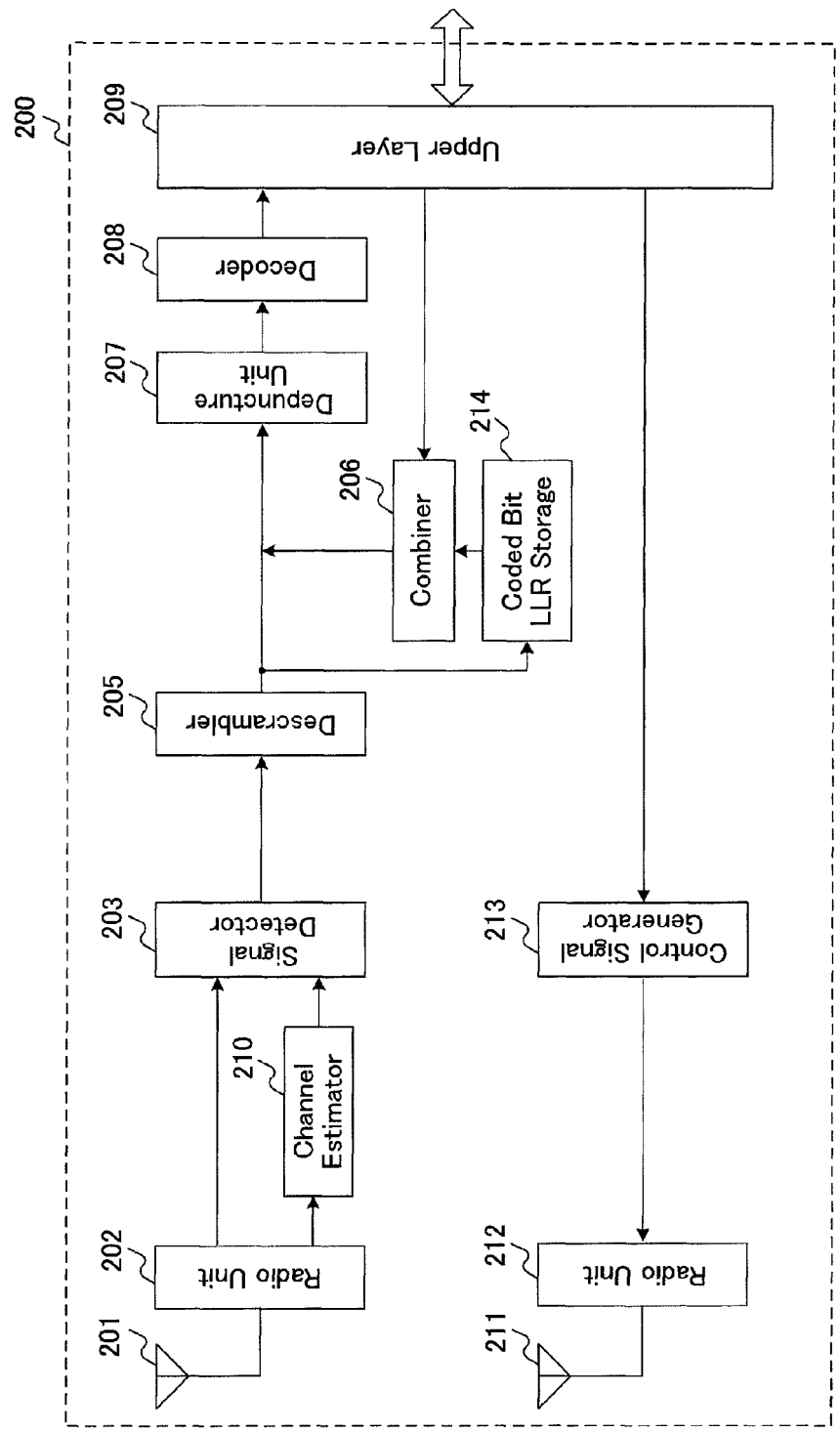
FIG. 2 is a diagram for illustrating a configuration of a base station (anchor base station) in the first embodiment.

FIG. 2 is a schematic block diagram showing a configuration of base station 200 (anchor base station) in the first embodiment. Base station 200 includes a receiving antenna unit 201, a radio unit 202, a signal detector 203, a descrambler 205, a combiner 206, a depuncture unit 207, a decoder 208, an upper layer 209, a channel estimator 210, a transmitting antenna unit 211, a radio unit 212, a control signal generator 213 and a coded bit LLR storage 214.

Receiving antenna unit 201 receives the signal transmitted from the mobile station that is connecting to base station 200. Radio unit 202 converts the signal received at receiving antenna unit 201 from the radio frequency to the baseband, performs band limitation with a receiving filter and analog-to-digital converts (A/D converts) the signal so as to output it as a received signal.

Signal detector 203 makes channel distortion compensation for the received signal based on the channel estimate value generated by channel estimator 210 and then outputs the demodulated result to the descrambler.

Figure 3:
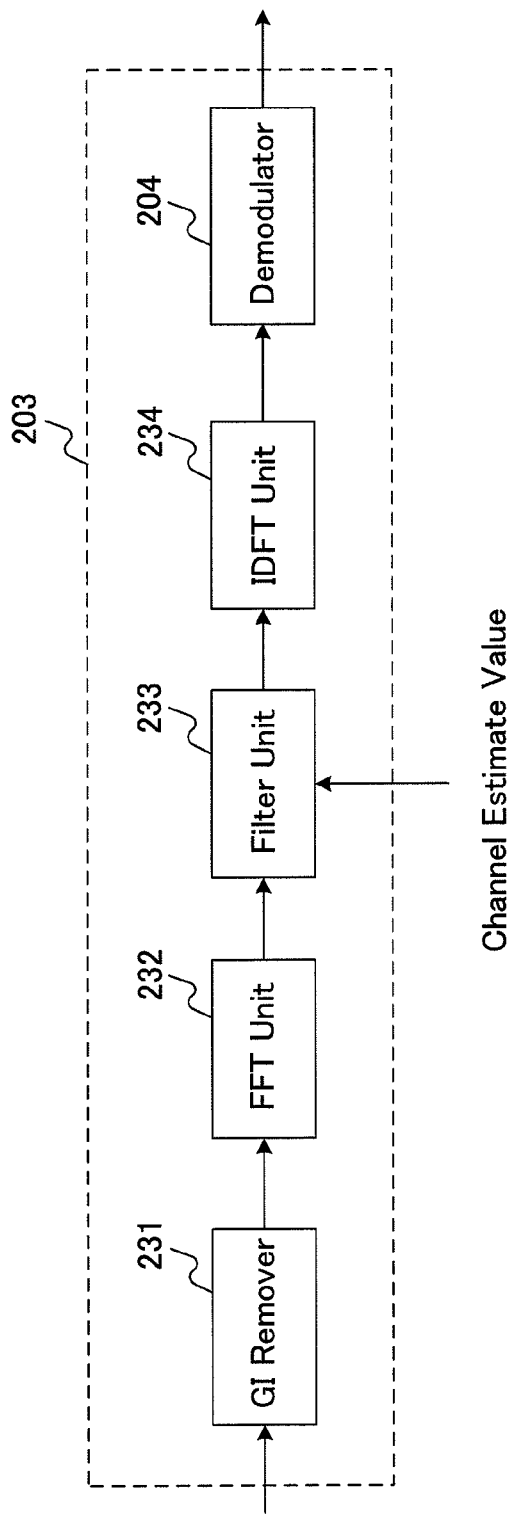
FIG. 3 is a diagram for illustrating a configuration of a signal detector in the first embodiment.

FIG. 3 is a schematic block diagram showing a configuration of signal detector 203. Signal detector 203 includes a GI remover 231, a FFT unit 232, a filter unit 233, an IDFT unit 234 and a demodulator 204.

GI remover 231 removes GIs from the received signal. FFT unit 232 transforms the signal output from the GI remover 231 from the time domain to the frequency domain by a fast Fourier transforming process (FFT). Here, when in SC-FDMA a plurality of mobile stations are multiplexed in the frequency direction, the process after the FFT process performed by FFT unit 232 is implemented for each of the mobile stations or for each of units in which IDFT is performed. Next, the process for a mobile station that is performing cooperative communication will be described.

Filter unit 233 multiplies the signal in the frequency domain output from the FFT unit, with a channel compensation weight calculated using the channel estimate value. Examples of the channel compensation weight include weight coefficients based on MMSE (Minimum Means Square Error) standard and the like.

IDFT unit 234 performs an IDFT (Inverse Discrete Fourier Transform) process on the signal output from filter unit 233.

Demodulator 204 demaps the output signal from the IDFT unit 234 to calculate coded bit LLRs (Log Likelihood Ratios, the soft-decision values) as the bit likelihood information. Here, coded bits (the hard-decision values) may be calculated instead of the coded bit LLRs.

Returning to FIG. 2, descrambler 205 performs a descrambling process by multiplying the coded bit LLR after demodulation with a scramble code sequence unique to each mobile station. Coded bit LLR storage 214 stores the coded bit LLRs after demodulation relating to the cooperative mobile station, among the coded bit LLRs after demodulation, output from descrambler 205.

Combiner 206 combines the coded bit LLRs of the data signal of the cooperative mobile station, transmitted from the cooperative base station and the coded bit LLRs stored in coded bit LLR storage 214. Here, transmission of data signals etc. from a base station to another base station is also called forwarding.

Depuncture unit 207 performs a puncturing process on the coded bit LLR after demodulation, output from the descrambler, or the coded bit LLR after demodulation, output from the combiner, in accordance with the MCS that is applied to the coded bits.

Decoder 208 performs an error correction decoding process on the coded bit LLR output from depuncture unit 207. The result of the error correction decoding process (coded bit LLRs after decoding, soft-decision values) is transmitted to cooperative base station 300 that cooperates with anchor base station 200 via upper layer 209. The result of the error correction decoding process may be given by the coded bits after decoding (hard-decision values).

Here, the above-described GI remover 231, FFT unit 232, filter unit 233 and IDFT unit 234 are called as a SC-FDMA signal detecting processor.

Control signal generator 213 generates a control signal (DCI) for each mobile station based on the control information for each mobile station output from upper layer 209. The control signal includes a transmission timing adjustment signal (Timing Advance Command) and is given notice to mobile stations through the PDCCH.

In radio unit 212, digital-to-analog conversion (D/A conversion), waveform shaping by a transmission filter and conversion to the radio frequency are performed so that the signal is transmitted from transmitting antenna unit 111. Further, though not illustrated, the information data on the mobile station may also be transmitted together with the control signal, through the PDSCH (Physical Downlink Shared CHannel). Here, it is also possible to transmit control signals through the PDSCH. It is also possible to use OFDMA for the downlink. Further, the control signals may include control information in the physical layer, other than the control information from the upper layer.

[1.3 The Configuration of Base Station (Cooperative Base Station)]

Figure 4:
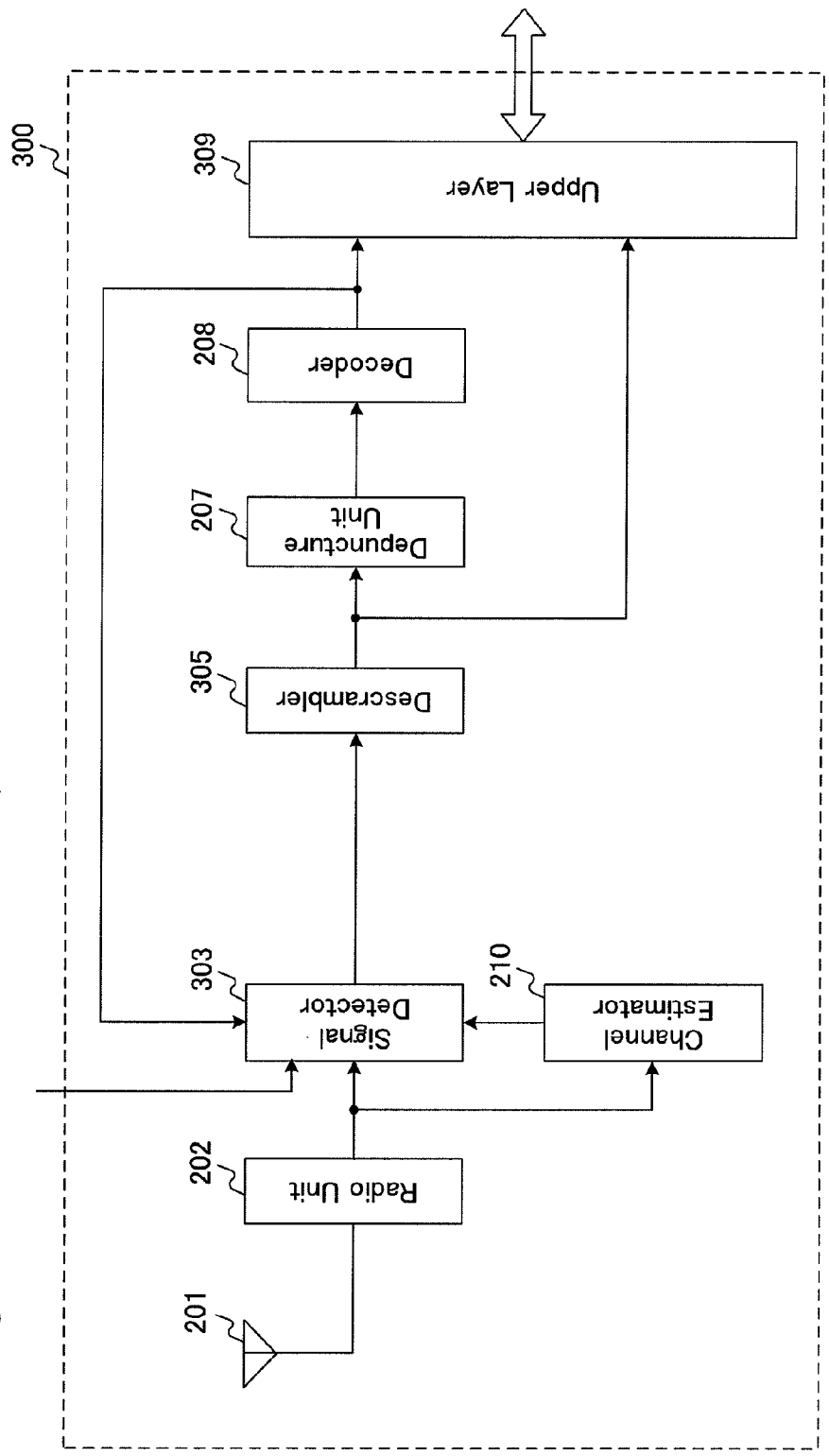
FIG. 4 is a diagram for illustrating a configuration of a base station (cooperative base station) in the first embodiment.

FIG. 4 is a schematic block diagram showing a configuration of base station 300 (cooperative base station) in the first embodiment. Base station 300 includes a receiving antenna unit 201, a radio unit 202, a signal detector 303, a descrambler 305, a depuncture unit 207, a decoder 208, an upper layer 309 and a channel estimator 210. Base station 300 is different from base station 200 in signal detector 303, descrambler 305 and upper layer 309. The following description will be made focusing on the above different components.

Signal detector 303 performs a signal detecting process on the received signal output from radio unit 202, based on the channel estimate value generated by channel estimator 210 and the detection result of the data signal transmitted from the anchor base station (base station 200).

Further, signal detector 303 performs a signal detecting process on the received signal output from radio unit 202, based on the channel estimate generated by channel estimator 210 and the decoded result of the data signal output from decoder 208. As the detection result of the data signal and the decoded result of the data signal, there exist coded bit LLRs (soft-decision values), coded bits (hard-decision values) and the like.

Figure 5:
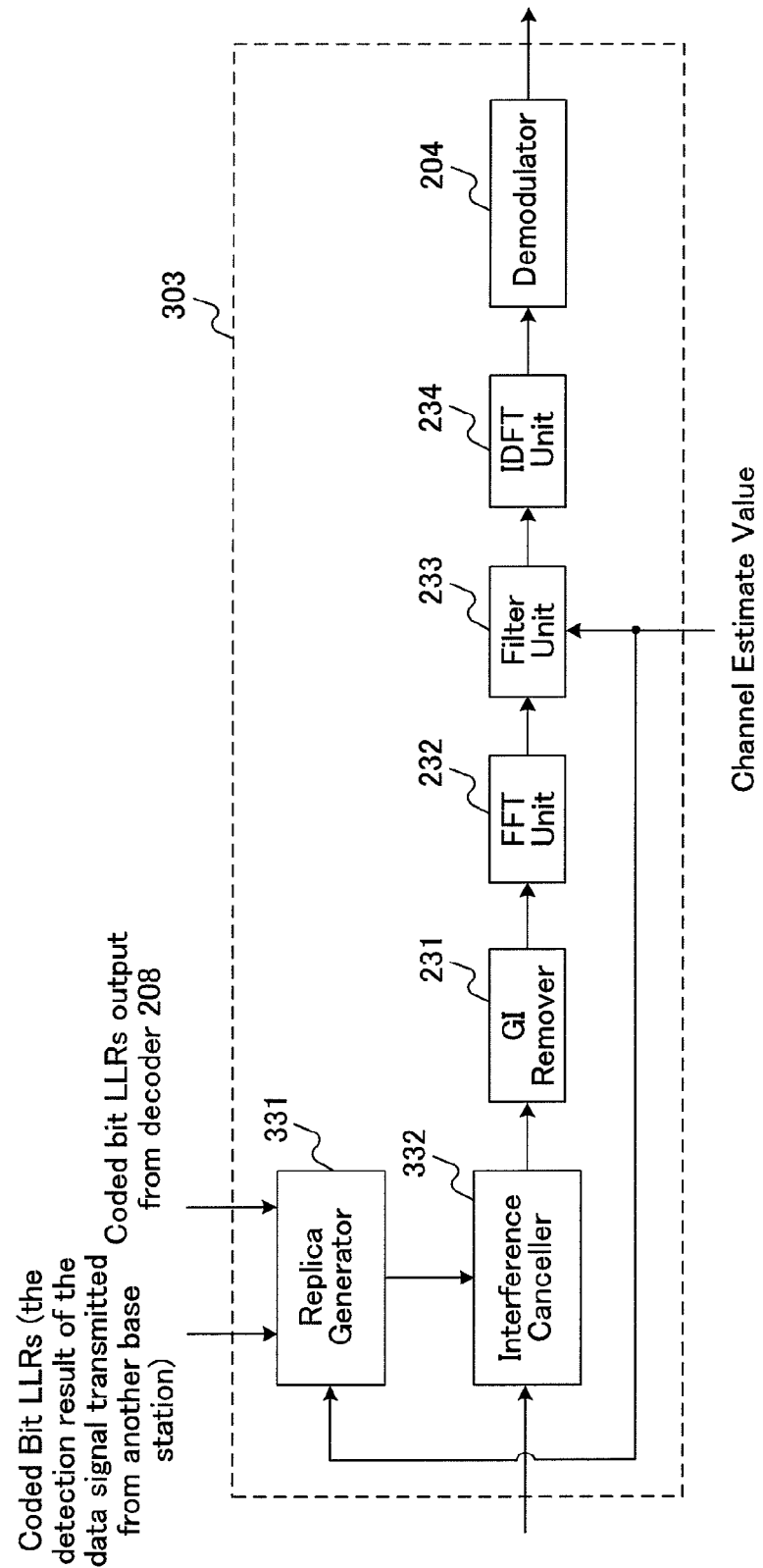
FIG. 5 is a diagram for illustrating a configuration of a signal detector in the first embodiment.

FIG. 5 is a schematic block diagram showing a configuration of signal detector 303. Signal detector 303 includes a replica generator 331, an interference canceller 332, GI remover 231, FFT unit 232, filter unit 233, IDFT unit 234 and demodulator 204.

Replica generator 331 generates a replica of the transmitted signal of mobile station 100-1, from the coded bit LLRs of the data signal of mobile station 100-1, transmitted from anchor base station (base station 200). Replica generator 331 generates a replica of the received signal of mobile station 100-1, received by base station 300, from the aforementioned transmitted signal replica and the channel estimate value.

Replica generator 331 also generates a replica of the transmitted signal of mobile station 100-3, from the coded bit LLRs of the data signal of mobile station 100-3, output from decoder 208. Further, replica generator 331 generates a replica of the received signal of mobile station 100-3 received by base station 300, from the aforementioned transmitted signal replica and the channel estimate value. The replica of the transmitted signal of the mobile station 100-3 can also be generated from the coded bit LLRs of the data signal of mobile station 100-3, output from demodulator 204.

Interference canceller 332 subtracts one of the aforementioned received signal replicas, from the received signal output from radio unit 202.

Figure 6:
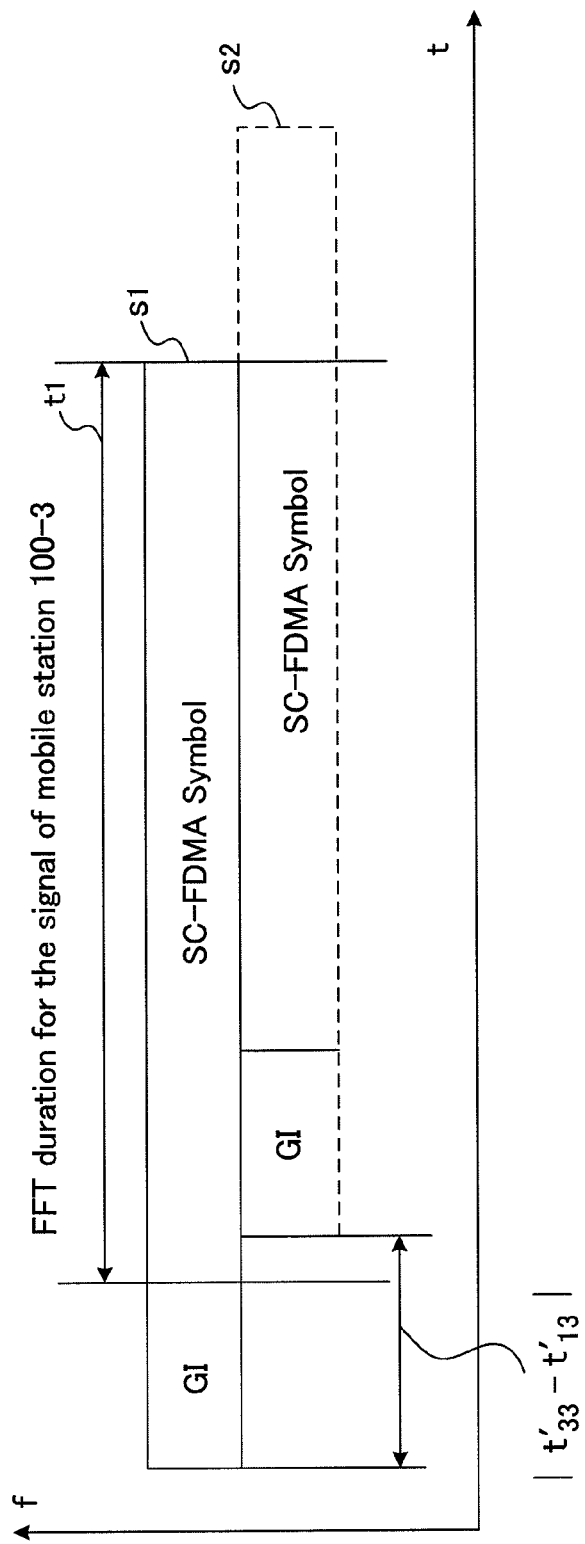
FIG. 6 is a diagram for illustrating an operation of eliminating a signal component in the first embodiment.

FIG. 6 is a schematic diagram showing interference canceller 332 eliminating the signal component of mobile station 100-1. The horizontal axis represents time and the vertical axis represents frequency. s1 and s2 denote the received signals output from radio unit 202, s1 being the data signal component of mobile station 100-3 which base station 300 has received and s2 being the data signal component of mobile station 100-1 which base station 300 has received. Owing to setting of the transmission timing of mobile station 100-1 on the basis of connection to base station 200, the time difference of arrival of s1 to s2 results in being greater than the GI length. Here, in this case, it is assumed that the time difference of arrival between mobile station 100-1 and mobile station 100-2 at base station 200 falls within the GI length.

Interference canceller 332 extracts data signal component s1 of mobile station 100-3, by eliminating the received signal replica of s2, generated by replica generator 331, from the received signal input from radio unit 202. The received signal replica of s2 is generated from the coded bit LLRs of the data signal of mobile station 100-1, transmitted from the anchor base station.

GI remover 231 removes the GI durations from the signal output from interference canceller 332. The GI duration of s1 in FIG. 6 is removed.

FFT unit 232 transforms the signal output from the GI remover 231 from the time domain to the frequency domain by a fast Fourier transforming process (FFT) in time with the data signal component s1 of mobile station 100-3. This means that the duration t1 in FIG. 6 forms the FFT duration. The signal that FFT unit 232 outputs in correspondence with the data signal of mobile station 100-3 is successively processed through filter unit 233, IDFT unit 234, demodulator 204, descrambler 305, depuncture unit 207 and decoder 208, and the coded bit LLRs of mobile station 100-3 after decoding, output from decoder 208, is input to upper layer 309 and signal detector 303.

Figure 7:
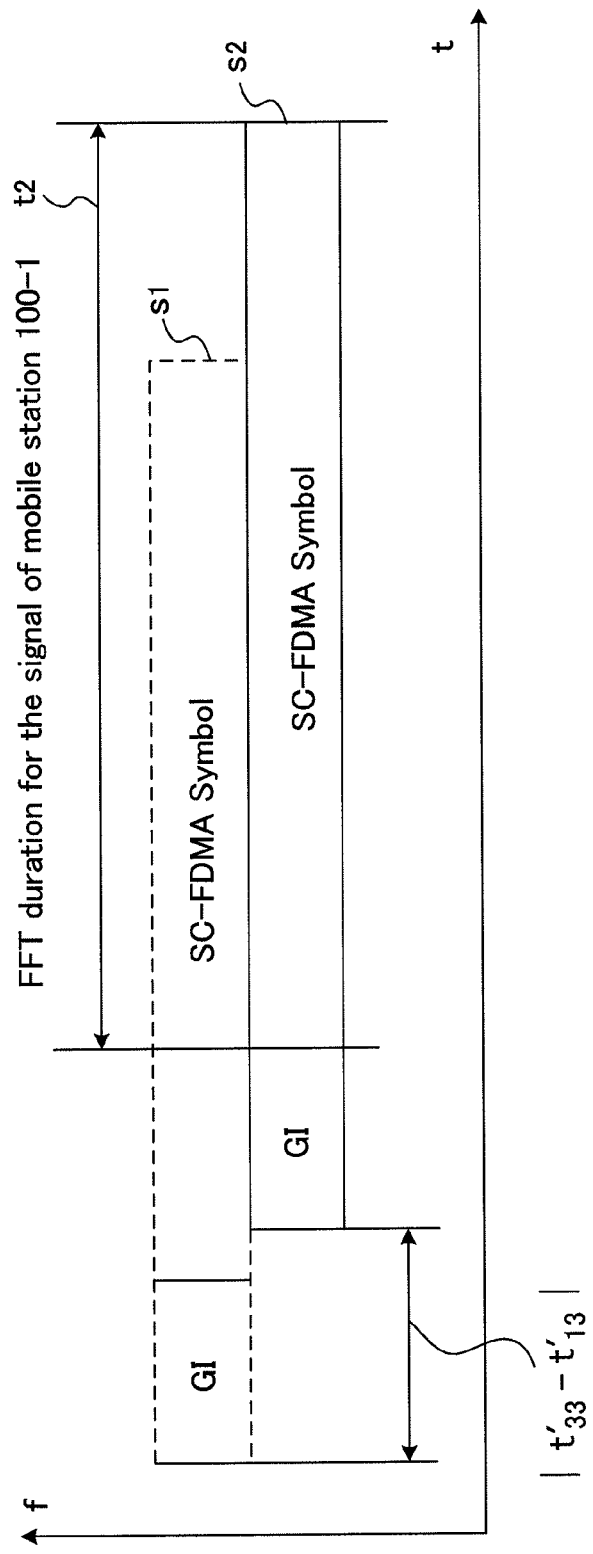
FIG. 7 is a diagram for illustrating an operation of eliminating a signal component in the first embodiment.

FIG. 7 is a schematic diagram showing interference canceller 332 canceling the signal component of mobile station 100-3. Interference canceller 332 extracts data signal component s2 of mobile station 100-1, by eliminating the received signal replica of s1, generated by replica generator 331, from the received signal input from radio unit 202, and the extracted component is input to GI remover 231. The received signal replica of s1 is generated from the coded bit LLRs of the data signal of mobile station 100-3, output from decoder 208.

GI remover 231 removes the GI duration of s2 in FIG. 6. FFT unit 232 transforms the signal output from the GI remover 231 from the time domain to the frequency domain by a fast Fourier transforming process (FFT) in time with the data signal component s2 of mobile station 100-1. This means that the duration t2 in FIG. 6 forms the FFT duration.

The signal that FFT unit 232 outputs in correspondence with the data signal of mobile station 100-1 is successively processed through filter unit 233, IDFT unit 234, demodulator 204, descrambler 305. The coded bit LLRs after demodulation of the data signal of mobile station 100-1, output from descrambler 305 are input to depuncture unit 207 and upper layer 309. Here, similarly to the anchor base station, the above-described GI remover 231, FFT unit 232, filter unit 233 and IDFT unit 234 are called a SC-FDMA signal detecting processor.

Here, the coded bit LLRs after the demodulation for the data signal from mobile station 100-1 may be further converted into coded bit LLRs after decoding through decoder 208, then input to interference canceller 332. Interference canceller 332 once again performs signal detection on the data signal of mobile station 100-3 using the coded bit LLRs after decoding for the data signal from the mobile station 100-1 so as to be able to achieve signal detection with a higher precision.

Returning to FIG. 4, upper layer 309 decides the coded bit LLRs of the mobile station 100-3, output from decoder 208 to thereby calculate information data. The upper layer also transmits the coded bit LLRs of the mobile station 100-1 to the anchor base station (base station 200). The signal transmitted to the anchor base station may be the coded bits, which are the hard-decision result of the coded bit LLRs.

Here, the cooperative base station includes a transmitting system for generating the downlink data signals to be transmitted from the cooperative base station to each mobile station and control signals other than the control signals for controlling the cooperative mobile station, but this is omitted in FIG. 4.

[1.4 Processing Flow]

Figure 8:
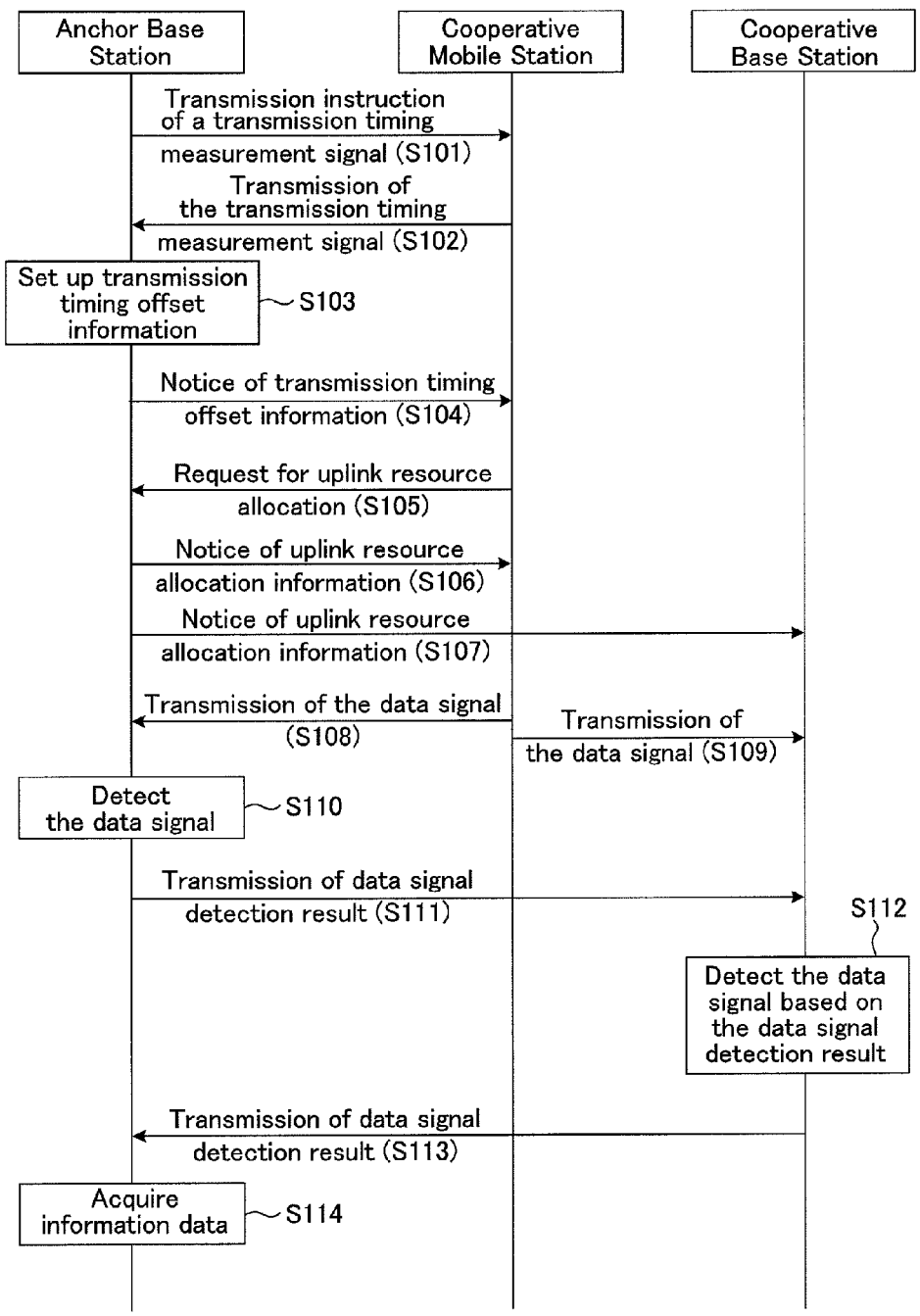
FIG. 8 is a sequence diagram for illustrating the operation in the first embodiment.

FIG. 8 is a sequence diagram for illustrating an operational example in the first embodiment in which a cooperative mobile station (mobile station 100-1) transmits a data signal to the anchor base station and the cooperative base station, and information bits of the cooperative mobile station are acquired based on the data signal transmitted to the two.

To begin with, the anchor base station (base station 200) transmits a control signal (e.g., Preamble Indicator for RACH in LTE) that instructs the cooperative mobile station to transmit a control signal for measuring the transmission timing (transmission timing measurement signal, e.g., random access preamble in LTE) (S101). At this time, the resource for transmitting the transmission timing measurement signal and the format of the transmission timing measurement signal (e.g., preamble sequence) are indicated.

Next, the cooperative mobile station, following the control signal that indicates transmission of the transmission timing measurement signal, transmits a transmission timing measurement signal to the anchor base station (S102). For example, the transmission timing measurement signal is transmitted via the RACH (Random Access CHannel). Here, it is also possible for the cooperative mobile station to transmit a transmission timing measurement signal without regard to whether to receive a control signal that indicates transmission of the transmission timing measurement signal. In this case, the available resource and format have been informed through the PBCH (Physical Broadcast CHannel) from the anchor base station, so that the transmission timing measurement signal can be transmitted based on those.

The anchor base station having received the transmission timing measurement signal calculates the time difference between the transmission timing measurement signal and the reference timing which the base station per se holds, and prepares and sets up transmission timing offset information (S103). When the anchor base station receives transmission timing measurement signals from other mobile stations (mobile station 100-2 in FIG. 25) that has selected to connect to the base station per se, the anchor base station also prepares transmission timing offset information on each mobile station.

The anchor base station performs transmission timing offset for all the mobile stations that connect to the anchor base station such that the time difference between the transmission timing measurement signal from each mobile station and the aforementioned reference timing which the anchor base station holds falls equal to or shorter than the GI length. Here, the reference timing which the anchor base station holds is preferably the same as the reference signal the cooperative base station holds.

Next, the anchor base station notifies the transmission timing offset information to the cooperative mobile station by means of a downlink control signal (S104).

Next, the cooperative mobile station makes an uplink resource allocation request (SR: Scheduling Request) to the anchor base station, in accordance with the transmission timing notified by the transmission timing offset information (S105). For example, the uplink resource allocation request may be given through the PUCCH (physical Uplink Control CHannel).

Next, the anchor base station notifies the cooperative mobile station of the uplink resource allocation information through the PDCCH or the like (S106). At the same time, the anchor base station also notifies the cooperative base station of the resource allocation information for the cooperative mobile station (S107).

Next, the cooperative mobile station transmits a data signal to the anchor base station and cooperative base station, based on the resource allocation information (S108 and S109). Here, the resources used for transmission of the data signal are scheduled by another control signal so that the data signal will not collide with other signals of the anchor base station and cooperative base station. The anchor base station performs a detecting process on the received data signal of the cooperative mobile station (S110) to obtain coded bit LLRs.

Next, the anchor base station transmits the coded bit LLRs to the cooperative base station through the interface of the upper layer (e.g., X2 interface in LTE) (S111).

Next, the cooperative base station, using the coded bit LLRs received at 5111, performs a signal detecting process of the data signal received at S109 (S112). The cooperative base station transmits the coded bit LLRs of the data signal of the cooperative mobile station, among the data signals obtained by the signal detecting process, to the anchor base station through the interface of the upper layer (S113). The coded bit LLRs of the data signals of other mobile stations (e.g., mobile station 100-3 in FIG. 25) obtained by the signal detecting process are determined at the upper layer to provide information data.

Finally, the anchor base station combines the coded bit LLRs of the data signal which the anchor base station has received from the cooperative mobile station and the coded bit LLRs of the data signal of the cooperative mobile station, transmitted from the cooperative base station at 5113 (at combiner in FIG. 2) and performs a decoding process (at decoder 208 in FIG. 2) on the combined coded bit LLRs to thereby calculate the coded bit LLRs after decoding. The anchor base station acquires information data of the cooperative mobile station from the aforementioned coded bit LLRs after decoding (S114). It is noted that the information data of each mobile station acquired as above is transmitted on the downlink to the mobile station to which each information data is addressed.

Figure 9:
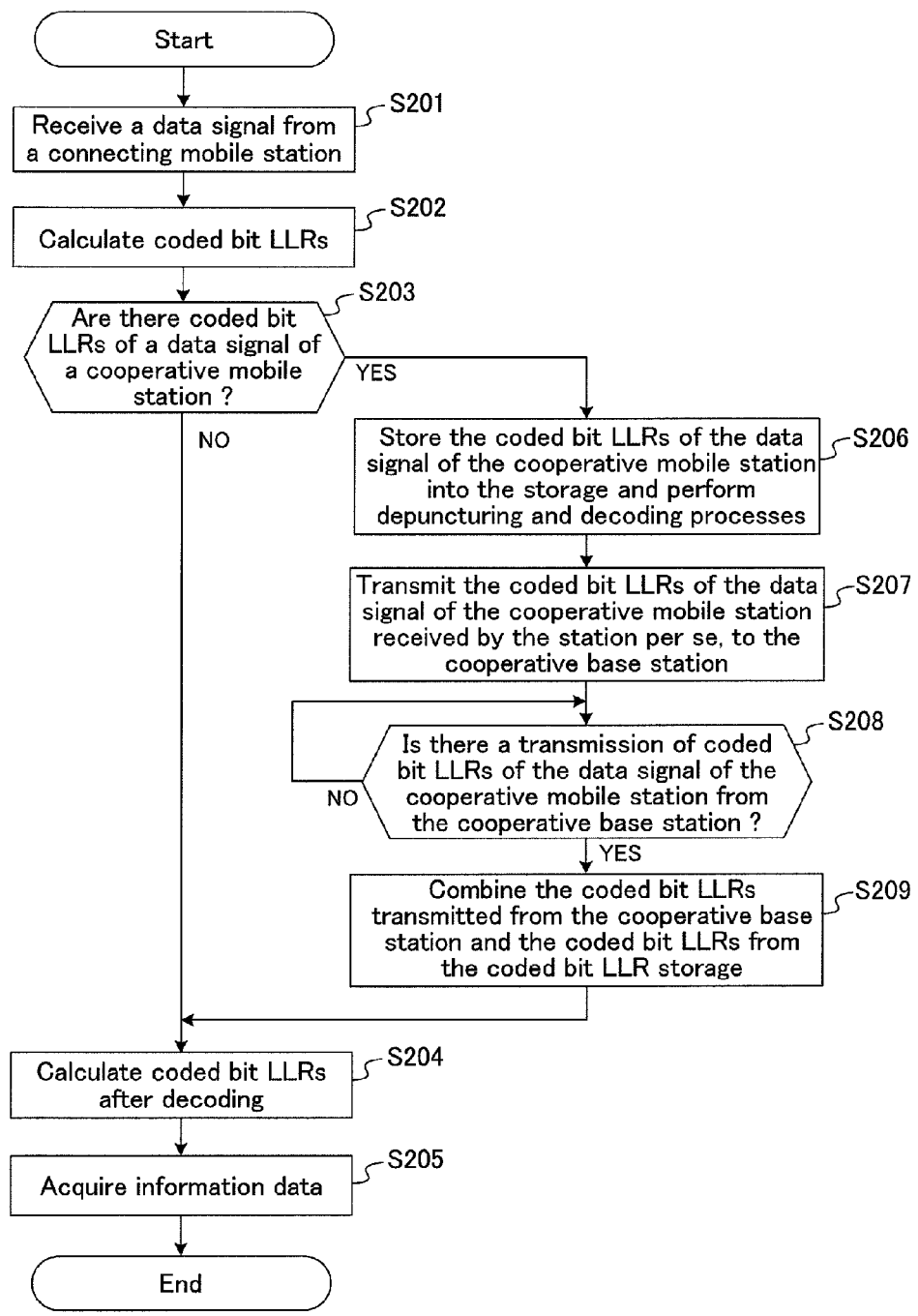
FIG. 9 is a flow chart for illustrating a process in the first embodiment.

Subsequently, FIG. 9 is a flow chart showing an operational example of a receiving process on the data signal which the anchor base station in the first embodiment has received from a mobile station.

First, the anchor base station receives data signals from a plurality of mobile stations that have selected to connect to the base station per se (Step S201). The received data signals also include the data signal from the cooperative mobile station. The anchor base station performs SC-FDMA signal detection, demodulation, descrambling process and the like on the received data signals and calculates coded bit LLRs after demodulation (Step S202).

Then, it is determined whether the aforementioned coded bit LLRs after demodulation include coded bit LLRs of data signal from the cooperative mobile station. At this point, if there are no coded bit LLRs of the data signal from the cooperative mobile station, that is, when there are only the coded bit LLRs of the data signals other than the cooperative mobile station (Step S203; NO), coded bit LLRs after decoding are calculated by depuncturing and decoding processes (Step S204), so that information data on each mobile station is obtained from the coded bit LLRs after decoding (Step S205).

On the other hand, when there are the coded bit LLRs after demodulation, that is, for the coded bit LLRs of the data signal from the cooperative mobile station (Step S203; YES), the coded bit LLRs of the data signal of the cooperative mobile station after demodulation are stored into the storage, and these coded bit LLRs after demodulation are depunctured and decoded so at to calculate coded bit LLRs of the data signal of the cooperative mobile station after decoding (Step S206). Then, the coded bit LLRs after decoding of the data signal of the cooperative mobile station, calculated at Step S206 are transmitted to the cooperative base station (Step S207).

Next, the anchor base station determines whether or not there is a transmission from the cooperative base station, of the coded bit LLRs in association with the data signal which the cooperative base station has received from the cooperative mobile station (Step S208). If there is no transmission (Step S208; NO), the anchor base station waits for a transmission coming (Step S208; NO).

When there is a transmission (Step S208; YES), the anchor base station combines the transmitted coded bit LLRs after demodulation of the data signal of the cooperative mobile station which the cooperative base station has received, with the coded bit LLRs after demodulation of the data signal of the cooperative mobile station which the anchor base station has received (the coded bit LLRs stored in the coded bit LLRs storage) (Step S209). Then, the combined coded bit LLRs of the data signal of the cooperative mobile station are subjected to depuncturing, decoding and other processes, to thereby calculate the coded bit LLRs after decoding of the cooperative mobile station (Step S204). Finally, the coded bit LLRs after decoding of the cooperative mobile station are decided to thereby produce information data on the cooperative mobile station (Step S205).

As described above, the anchor base station calculates information data of the cooperative mobile station, based on the combined signal of the coded bit LLRs after demodulation of the cooperative mobile station which the cooperative base station has calculated using a received signal replica and the coded bit LLRs after demodulation of the cooperative mobile station which the anchor base station per se has calculated. As a result, it is possible to acquire information data of the cooperative mobile station without being affected by interference due to time lag of transmission at the cooperative base station.

Figure 10:
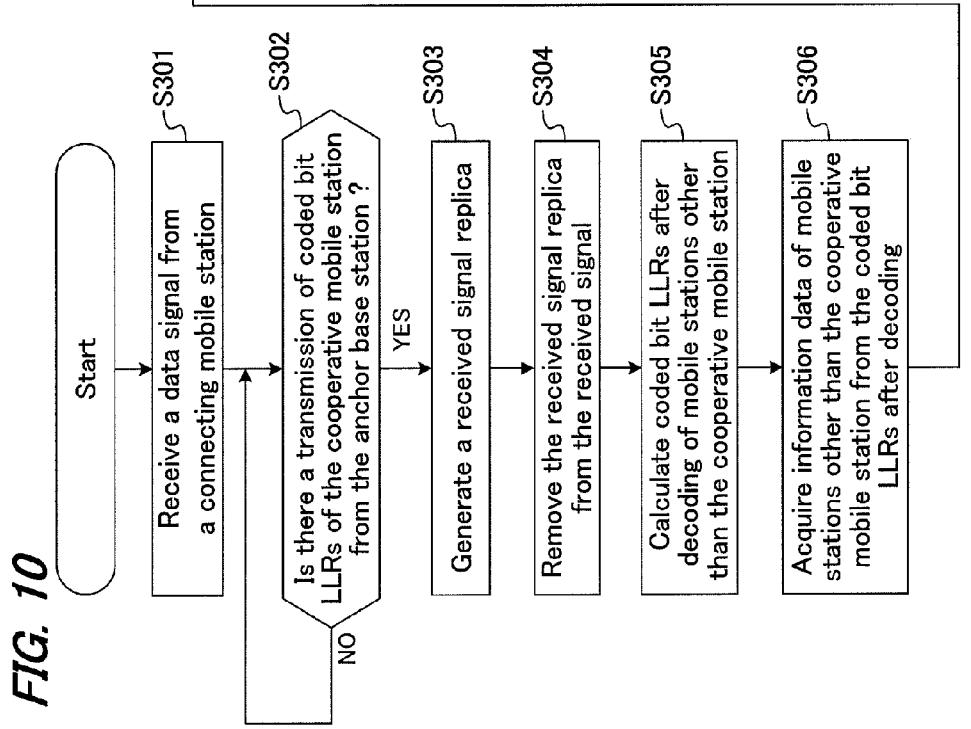
FIG. 10 is a flow chart for illustrating a process in the first embodiment.

FIG. 10 is a flow chart showing an operational example of a receiving process in the cooperative base station on the data signal received from a mobile station, in the first embodiment.

First, the cooperative base station receives data signals from a plurality of mobile stations that have selected to connect to the base station per se (Step S301). The received data signals also include the data signal from the cooperative mobile station.

Next, the cooperative base station determines whether or not there is a transmission from the anchor base station, of coded bit LLRs in association with the data signal of the cooperative mobile station which the cooperative base station per se has received (Step S302). If there is no transmission (Step S302; NO), the cooperative base station waits for until transmission comes. When there is a transmission of the coded bit LLRs from the anchor base station (Step S302; YES), the cooperative base station, based on the transmitted coded bit LLRs of the cooperative mobile station, creates a received signal replica of the data signal of the cooperative mobile station which the cooperative base station has received (Step S303) and removes the received signal replica from the received signal (the signal received at S303) of the cooperative base station (Step S304).

Next, the signal from which the received signal replica of the data signal of the cooperative mobile station has been removed at Step S304 is subjected to SC-FDMA signal detection, demodulation, descrambling, depuncturing and decoding processes to thereby calculate coded bit LLRs after decoding of mobile stations other than the cooperative mobile station (Step S305). Then, from the coded bit LLRs after decoding of mobile stations other than the cooperative mobile station, the information data on the mobile stations other than the cooperative mobile station is acquired (Step S306). The coded bit LLRs after decoding of the mobile stations other than the cooperative mobile station is fed back to the signal detector (Step S307). The signal detector, using the feedback coded bit LLRs after decoding, creates a received signal replica of the received data signals from mobile stations other than the cooperative mobile station (Step S308).

Next, the received signal replicas of the received data signals from mobile stations other than the cooperative mobile station are removed from the received signal of the cooperative base station (the signal received at Step S301) (Step S309). Then, the signal from which the received signal replicas were removed at Step S309 is subjected to SC-FDMA signal detection, demodulation, descrambling processes so as to calculate the coded bit LLRs after demodulation for the data signal which the cooperative base station has received from the cooperative mobile station (Step S310). The coded bit LLRs after demodulation, calculated at Step S310 are transmitted to the anchor base station (Step S311) to complete the processing.

As illustrated at Steps S303 to S306 above, the replica of the received signal from the cooperative mobile station, prepared based on the coded bit LLRs of the data signal of the cooperative mobile station, transmitted from the anchor base station is removed from the received signal of the cooperative base station, then the data signals received from mobile stations other than the cooperative mobile station are subjected to signal detection, demodulation, decoding and other processes, whereby it is possible for the mobile stations other than cooperative mobile station to reduce reception of interference from the cooperative mobile station, caused by the time lag of the transmission timing of the cooperative mobile station, hence suppress degradation of decoding precision of the data signals from the mobile stations other than the cooperative mobile station.

Also, as illustrated at Steps S307 to S311, the replicas of the received signals received from the mobile stations other than the cooperative mobile station, prepared and calculated from the coded bit LLRs after decoding at the above Step S303 to S306 are removed from the received signal of the cooperative base station, and then signal-detection and demodulation of the data signal received from the cooperative mobile station are performed, whereby it is possible for the cooperative mobile station to reduce reception of interference from the other mobile, caused by the time lag of the transmission timing of cooperative mobile station, hence suppress degradation of decoding precision of the data signal from the cooperative mobile station.

It is also possible to perform the signal detecting process to the decoding process using the coded bit LLRs of the data signal of the cooperative mobile station, transmitted by the anchor base station, and the signal detecting process to the decoding process using the coded bit LLRs calculated by the decoding process at the station per se, iteratively. In this case, the coded bit LLRs are exchanged a plurality number of times between the cooperative base station and the anchor base station.

Further, in the signal detecting process to the decoding process using the coded bit LLRs calculated by the decoding process at the station per se, the aforementioned coded bit LLRs may use the coded bit LLRs of the data signals of the mobile stations other than the cooperative mobile station, in addition to the coded bit LLRs of the data signal of the cooperative mobile station. In this case, it is also possible to alternately iteratively perform the signal detecting process to the decoding process using the coded bit LLRs of the data signal of the cooperative mobile station and the signal detecting process to the decoding process using the coded bit LLRs of the data signals of the mobile stations other than the cooperative mobile station.

As described heretofore, when the cooperative mobile station transmits an identical data signal to a plurality of base stations, the cooperative mobile station transmits the identical data to the multiple base stations, based on the reference timing which the anchor base station among the data-transmitted plurality of base stations holds. The cooperative base station among the plurality of base stations having received the signal from the cooperative mobile station uses the coded bit LLRs of the data signal which the cooperative mobile station has transmitted to the anchor base station when detecting the data signals from the plurality of mobile stations including the cooperative mobile station. With this arrangement, the cooperative base station can mitigate characteristics degradation due to corruption of the FFT periodicity and characteristics degradation due to interference (inter block interference) between signals in the FFT duration even when the timings at which the individual mobile stations receive the data signal fall out of the GI length.

Here in the present embodiment the coded bit LLRs for the data signal of the cooperative mobile station which the cooperative base station has received is transmitted to the anchor base station so that the anchor base station combines the coded bit LLRs for the data signal of the cooperative mobile station which the cooperative base station has received, with the coded bit LLRs for the data signal of the cooperative mobile station which the anchor base station has received. However, the cooperative base station may combine the coded bit LLRs for the data signal of the cooperative mobile station which the cooperative base station has received, with the coded bit LLRs for the data signal of the cooperative mobile station which the anchor base station has received to thereby acquire information data.

It is also possible to transmit the combined coded bit LLRs to the anchor base station. In this case, cooperative base station 300 may include a coded bit LLR storage 214 and a combiner 206 in FIG. 2, between descrambler 305 and depuncture unit 207.

Also, the cooperative base station can iteratively subject the same received signal which the cooperative base station has received to the signal detecting process using the coded bit LLRs transmitted from the anchor base station and the signal detecting process using the coded bit LLRs input from the decoder.

Further, though the above description was made on the assumption that the anchor base station is defined as a base station that transmits through PDCCH, a base station that performs transmission timing control may be used as the anchor base station.

Further, through the above description was made taking a case where an anchor base station is set for each mobile station, an anchor base station fixed for all the mobile stations may be used.

Though the above description was made taking a case where cooperative communication is performed between a plurality of base station apparatuses and at least one mobile terminal apparatus, cooperative communication may be performed in other modes. The modes may include cooperative communication between physically independent base station apparatuses, cooperative communication between sectors in a single base station apparatus having a sector configuration, cooperative communication between a base station apparatus and a transmitting apparatus (RRE, RRH or the like) connected cooperative communication between a base station apparatus and a transmitting apparatus (relay station, repeater station or the like) wirelessly connected thereto using relaying technologies. Further, cooperative communication may be performed using these modes in combination.

Further, when these transmitting apparatuses have a plurality of transmitting antenna units (antenna ports), cooperative communication may be performed using part of these transmitting antenna. Also, these transmitting apparatuses may perform communication with at least one mobile terminal apparatus by cooperating among a plurality of antenna ports.

Further, though a case in which the cooperative mobile station recognizes that it is performing cooperative communication was described, it is possible to embody even a (transparent) condition in which the fact of performing cooperative communication is not being recognized.

Moreover, the above description was made taking a case in which the coded bit LLRs are used as the data signal of the cooperative mobile station performing communications between the cooperative base station and the anchor base station, the invention is not limited to this. For example, it is also possible to use a signal of which the amount of information of the coded bit LLRs are cut down by using various kinds of compressing method such as quantization etc., a hard-decision signal and the like.

Still, when the anchor base station has correctly received the data signal from the cooperative base station, the process described above may be stopped. Also, when the cooperative base station has correctly received the data signal from the cooperative mobile station, it is possible to stop the anchor base station from performing the process described above.

2. The Second Embodiment

Next, the second embodiment will be described. The second embodiment is a communication system in which a mobile station (mobile terminal) transmits an identical data signal to a single anchor base station (serving base station, Serving cell) and a cooperative base station and the transmission timing of the mobile station is set at the reference timing of the cooperative base station. The description hereinbelow will be given taking a case as in the first embodiment, where three mobile stations 100-$n$ ($n=1$, 2 and 3) exist in the cell formed by the two base stations (base stations 200 and 300) shown in FIG. 25 and one mobile station 100-1 of the mobile stations, transmits a data signal to both base stations.

[2.1 Functional Configuration]

The configuration of cooperative mobile station 100-$n$ in the second embodiment is the same configuration of cooperative mobile station 100-$n$ in the first embodiment of FIG. 1, so that description is omitted.

Figure 11:
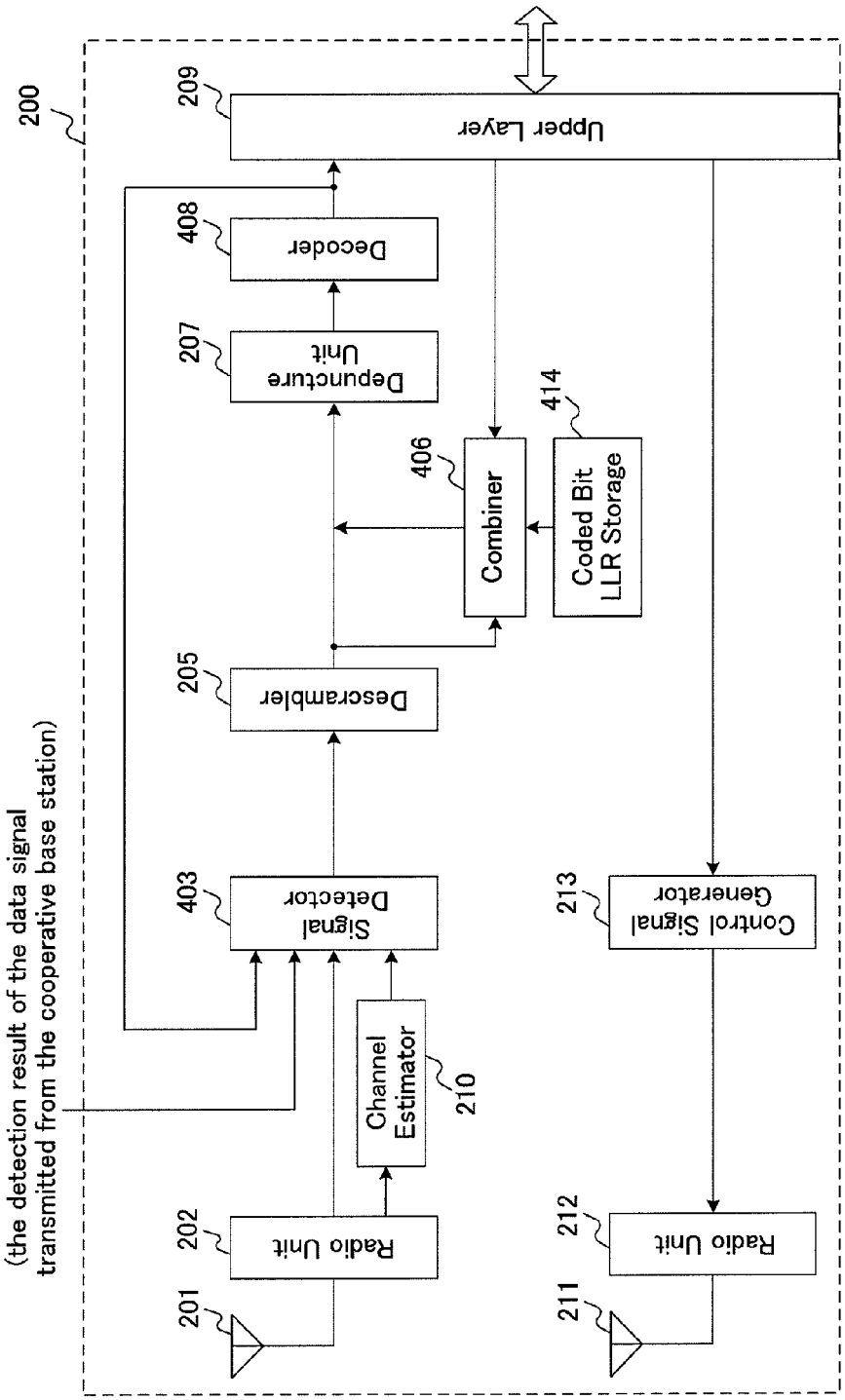
FIG. 11 is a diagram for illustrating a configuration of a mobile station in the second embodiment.

FIG. 11 is a schematic block diagram showing a configuration of a base station 200 (anchor base station) in the second embodiment. Base station 200 includes a receiving antenna unit 201, a radio unit 202, a signal detector 403, a descrambler 205, a combiner 406, a depuncture unit 207, a decoder 408, an upper layer 209, a channel estimator 210, a coded bit LLR storage 414, a transmitting antenna unit 211, a radio unit 212 and a control signal generator 213.

The base station 200 in FIG. 11 is different from the base station 200 of FIG. 2, in signal detector 403, combiner 406, decoder 408 and decode bit LLR storage 414. The following description will be made focusing on the above different components.

Signal detector 403 performs a signal detecting process on the received signal output from radio unit 202, based on the channel estimate value generated by channel estimator 210 and the detection result of the data signal transmitted from a cooperative base station (base station 300 described later). Further, signal detector 403 performs a signal detecting process on the received signal output from radio unit 202, based on the channel estimate value generated by channel estimator 210 and the decoded result of the data signal output from decoder 408. The configuration of signal decoder 403 is the same as that shown in FIG. 5.

Coded bit LLR storage 414 stores the detection result (code LLRs after demodulation) of the data signal of the cooperative mobile station transmitted from the cooperative base station. Combiner 406 combines the coded bit LLRs after demodulation stored in the coded bit LLR storage 414 with the coded bit LLRs after demodulation of the data signal of the cooperative mobile station, output from descrambler 205. Decoder 408 outputs the calculated coded bit LLRs after decoding to the upper layer and feeds back the coded bit LLRs after decoding to signal detector 403.

Figure 12:
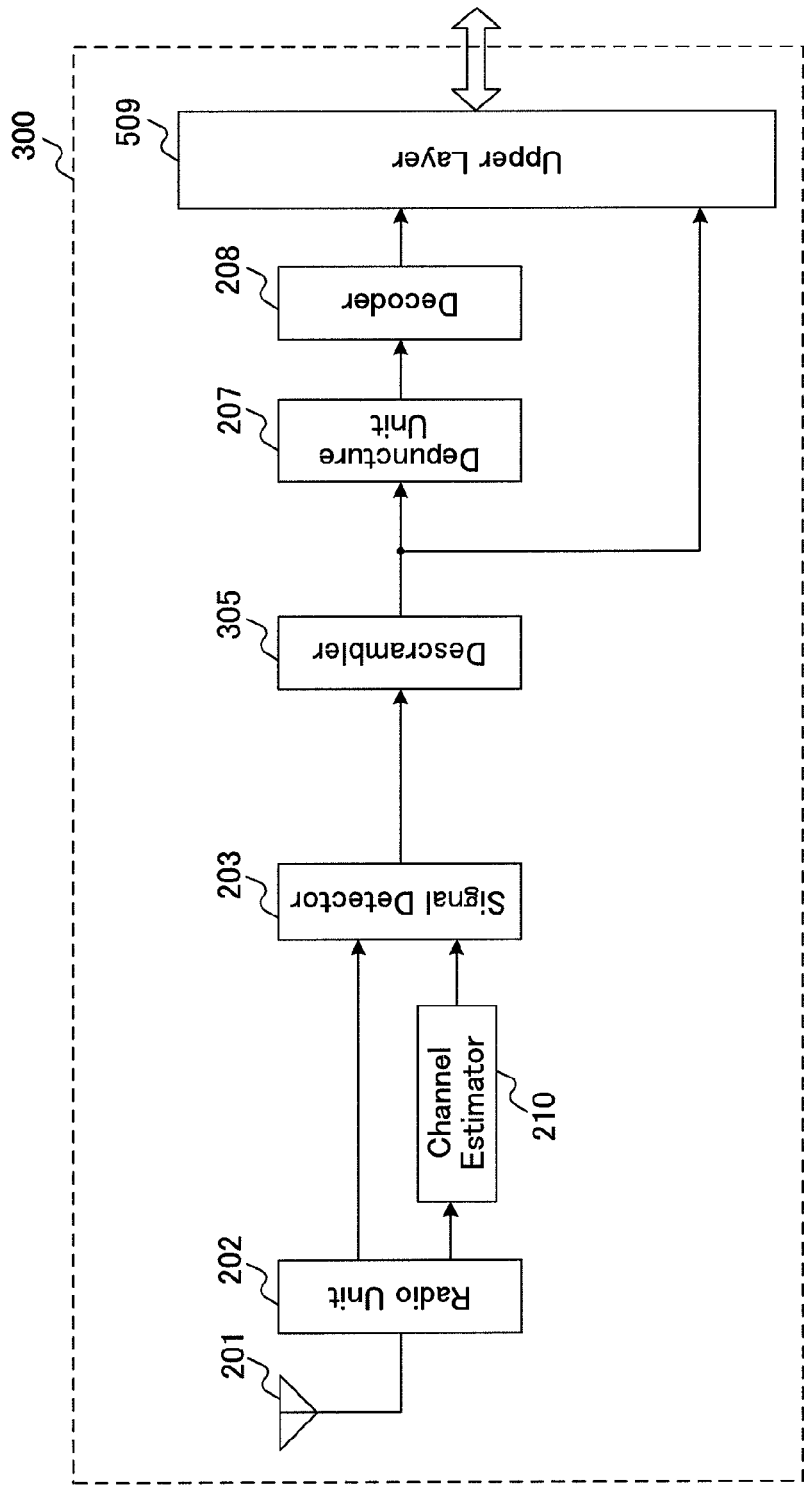
FIG. 12 is a diagram for illustrating a configuration of a base station (cooperative base station) in the second embodiment.

FIG. 12 is a schematic block diagram showing a configuration of base station 300 (cooperative base station) in the second embodiment. Base station 300 includes a receiving antenna unit 201, a radio unit 202, a signal detector 203, a descrambler 305, a depuncture unit 207, a decoder 208, an upper layer 509 and a channel estimator 210. The base station 300 is different from the base station 300 of the first embodiment in that the signal detector 303 is replaced by signal detector 203 and upper layer 309 is replaced by upper layer 509. Signal detector 203 has the configuration shown in FIG. 3. The components allotted with the same reference numerals as in base station 300 have the same functions as described in the first embodiment.

Upper layer 509 acquires information data on each mobile station from the coded bit LLRs after decoding, output from decoder 208. Upper layer 509 further transmits the coded bit LLRs after demodulation for the data signal of the cooperative mobile station, output from descrambler 305 to the anchor base station.

[2.2 Processing Flow]

Figure 13:
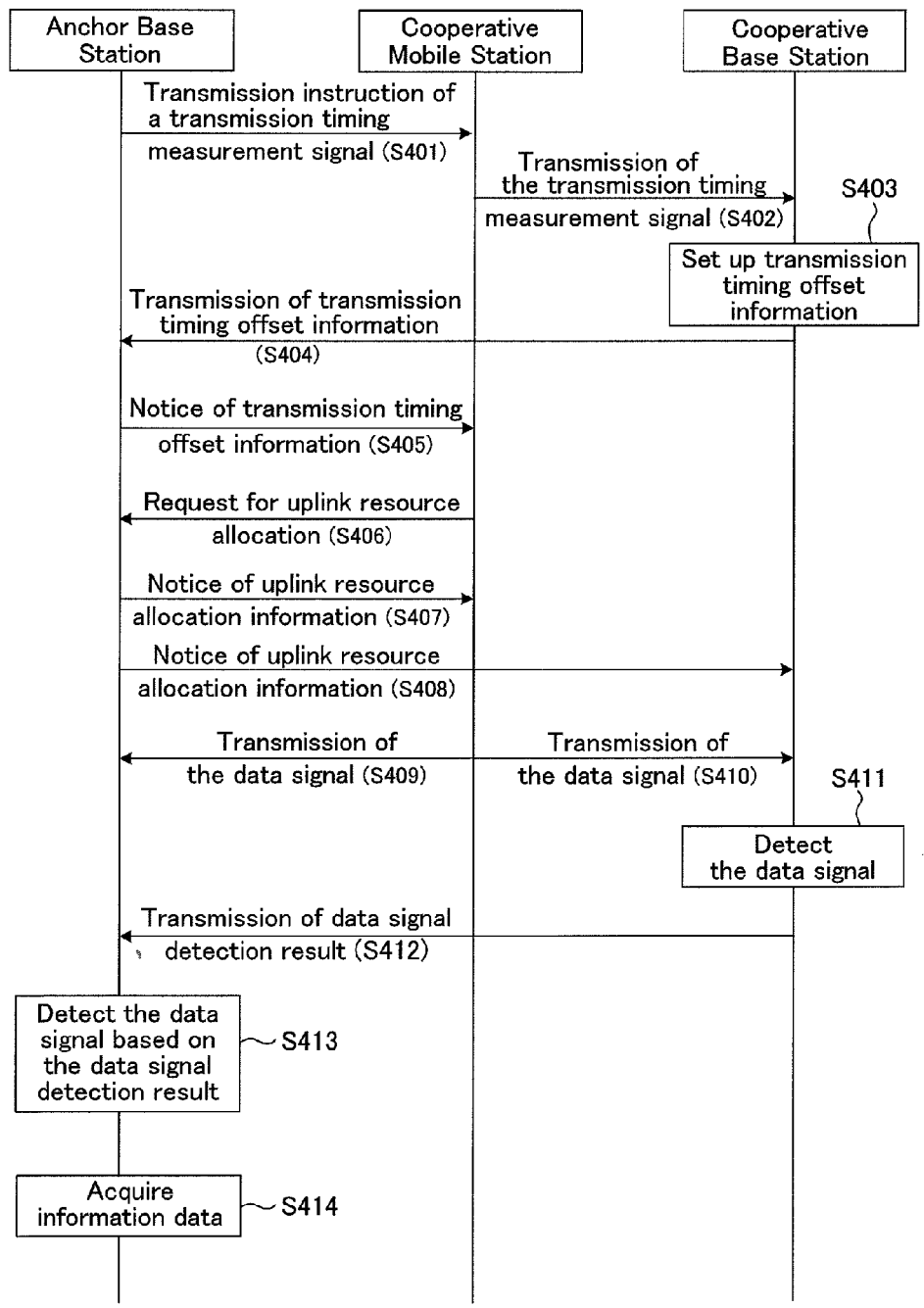
FIG. 13 is a sequence diagram for illustrating the operation in the second embodiment.

FIG. 13 is a sequence diagram for illustrating an operational example in the second embodiment in which a cooperative mobile station (mobile station 100-1) transmits a data signal to the anchor base station and the cooperative base station and information bits of the cooperative mobile station are acquired from the data signal transmitted to the two.

To begin with, the anchor base station (base station 200) transmits a control signal (e.g., Preamble Indicator for RACH in LTE) that instructs the cooperative mobile station to transmit a control signal for measuring the transmission timing (transmission timing measurement signal, e.g., random access preamble in LTE), to the cooperative mobile station (S401). At this time, the resource for transmitting the transmission timing measurement signal and the format of the transmission timing measurement signal (e.g., preamble sequence) are indicated.

Next, the cooperative mobile station, following the control signal that indicates transmission of the transmission timing measurement signal, transmits a transmission timing measurement signal to the cooperative base station (S402). For example, the transmission timing measurement signal is transmitted via the RACH (Random Access CHannel). Here, it is also possible for the cooperative mobile station to transmit a transmission timing measurement signal without regard to whether to receive a control signal that indicates transmission of the transmission timing measurement signal. The cooperative base station having received the transmission timing measurement signal calculates the time difference between the transmission timing measurement signal and the reference timing which the base station per se holds, and prepares and sets up transmission timing offset information (S403). When the cooperative base station receives a transmission timing measurement signal from other mobile stations (mobile station 100-3 in FIG. 25) that have selected to connect to the base station per se, the cooperative base station also prepares transmission timing offset information on each mobile station.

The cooperative base station performs transmission timing offset for all the mobile stations that connect to the cooperative base station such that the time difference between the transmission timing measurement signal from each mobile station and the aforementioned reference timing which the cooperative base station holds falls equal to or shorter than the GI length. Here, the reference timing which the cooperative base station base station holds is preferably the same as the reference timing which the anchor base station holds.

Next, the cooperative base station transmits the transmission timing offset information to the anchor base station by way of an interface of the upper layer (S404), and the anchor base station notifies the transmitted, transmission timing offset information to the cooperative mobile station by means of a downlink control signal (S405).

Next, the cooperative mobile station makes an uplink resource allocation request (SR: Scheduling Request) to the anchor base station, in accordance with the transmission timing notified by the transmission timing offset information (S406). For example the uplink resource allocation request may be given through the PUCCH (physical Uplink Control CHannel).

Next, the anchor base station notifies the cooperative mobile station of the uplink resource allocation information through PDCCH or the like (S407). At the same time, the anchor base station also notifies the cooperative base station of the resource allocation information for the cooperative mobile station (S408).

Next, the cooperative mobile station transmits a data signal to the anchor base station and cooperative base station, based on the resource allocation information (S409 and S410). Here, the resources used for transmission of the data signal are scheduled by another control signal so that the data signal will not collide with other signals of the anchor base station and cooperative base station.

The cooperative base station performs a detecting process and demodulating process and the like on the received data signal of the cooperative mobile station to obtain coded bit LLRs after demodulation. The cooperative base station further performs a decoding process and the like on the coded bit LLRs after the demodulation to calculate the coded bit LLRs after decoding and detect the data signal (S411).

Next, the cooperative base station transmits the coded bit LLRs after demodulation for the data signal of the cooperative mobile station, among the coded bit LLRs after the demodulation, to the anchor base station through the interface of the upper layer (e.g., X2 interface in LTE). Further, the cooperative base station transmits the coded bit LLRs after demodulation for the data signal of the cooperative mobile station, among the coded bit LLRs after the demodulation, to the anchor base station through the interface of the upper layer (e.g., X2 interface in LTE) (S412). Here, when the coded bit LLRs after demodulation for the data signal of the cooperative mobile station which the cooperative base station has received, are calculated at the anchor base station, it is possible to transmit only the coded bits after demodulation at S412.

When receiving a transmission of the coded bit LLRs of the cooperative mobile station from the cooperative base station, the anchor base station performs a signal detecting process and decoding process on the data signal received at S409, using the transmitted coded bit LLRs after the demodulation, to thereby calculate coded bit LLRs after decoding of mobile stations other than the cooperative mobile station (S413).

Further, the anchor base station calculates coded bit LLRs after demodulation of the cooperative mobile station by the signal detecting process on the data signal received at S409 using the coded bit LLRs after decoding of mobile stations other than the cooperative mobile station, and calculates coded bit LLRs after decoding of the cooperative mobile station, using the combined signal of the coded bit LLRs after demodulation of the cooperative mobile station and the coded bit LLRs after demodulation for cooperative mobile station, transmitted from the cooperative base station.

The upper layer acquires information data on each mobile station from the thus calculated coded bit LLRs for the cooperative mobile station and mobile stations other than the cooperative mobile station (S414). It is noted that the information data on each mobile station acquired as above is transmitted on the downlink to the mobile station to which each information data is addressed.

Figure 14:
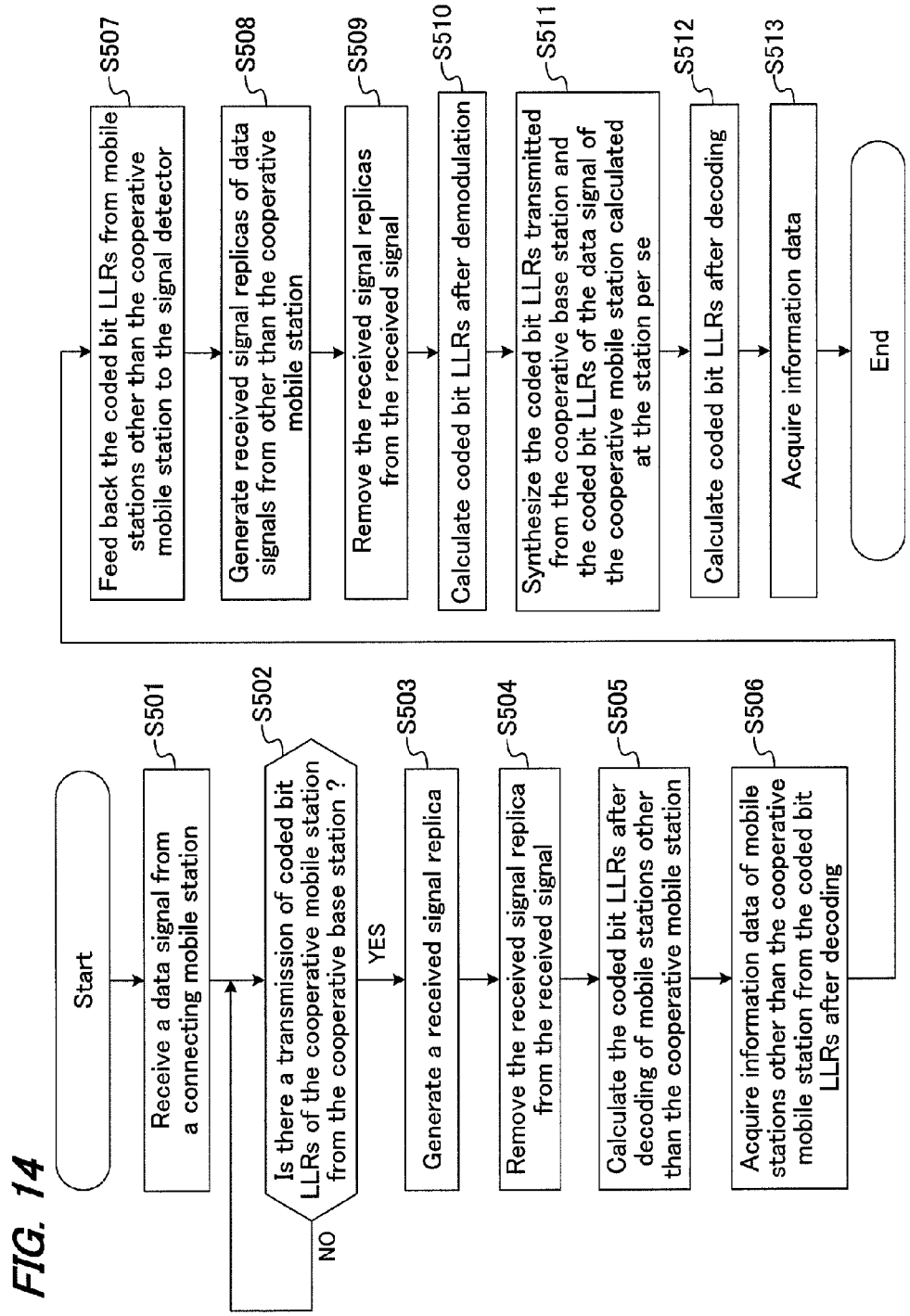
FIG. 14 is a flow chart for illustrating a process in the second embodiment.

FIG. 14 is a flow chart showing an operational example of a receiving process on the data signal which the anchor base station in the second embodiment has received from a mobile station.

First, the anchor base station receives data signals from a plurality of mobile stations that have selected to connect to the base station per se (Step S501). The received data signals also include the data signal from the cooperative mobile station.

Next, the anchor base station determines whether or not there is a transmission from the cooperative base station, of coded bit LLRs in association with the data signal of the cooperative mobile station which the anchor base station per se has received (Step S502). If there is no transmission (Step S502; NO), the anchor base station waits for until transmission comes. When there is a transmission of the coded bit LLRs from the cooperative base station (Step S502; YES), the anchor base station, based on the transmitted coded bit LLRs of the cooperative mobile station, creates a received signal replica of the data signal of the cooperative mobile station which the anchor base station has received (Step S503) and removes the received signal replica from the received signal (the signal received at S501) of the anchor base station (Step S504).

Next, the signal from which the received signal replica of the data signal of the cooperative mobile station has been removed at Step S504 is subjected to SC-FDMA signal detection, demodulation, descrambling, depuncturing and decoding processes to thereby calculate coded bit LLRs after decoding of mobile stations other than the cooperative mobile station (Step S505).

Then, from the coded bit LLRs after decoding of mobile stations other than the cooperative mobile station, the information data on the mobile stations other than the cooperative mobile station is acquired (Step S506). The coded bit LLRs after decoding of the mobile stations other than the cooperative mobile station is fed back to the signal detector (Step S507). The signal detector, using the feedback coded bit LLRs after decoding, creates a received signal replica of the received data signals from mobile stations other than the cooperative mobile station (Step S508).

Next, the received signal replicas of the received data signals from mobile stations other than the cooperative mobile station are removed from the received signal of the anchor base station (the signal received at Step S501) (Step S509). Then, the signal from which the received signal replicas were removed at Step S509 is subjected to SC-FDMA signal detection, demodulation, descrambling processes so as to calculate the coded bit LLRs after demodulation for the data signal which the anchor base station has received from the cooperative mobile station (Step S510). Then, the coded bit LLRs after demodulation, calculated at Step S510, is combined with the coded bit LLRs after demodulation for the data signal of the cooperative mobile station, transmitted from the cooperative base station (Step S511).

Subsequently, the combined signal obtained at Step S511 is subjected to depuncturing and decoding processes to calculate the coded bit LLRs after decoding (Step S512). Then, information data is acquired (Step S513) from the coded bit LLRs of the data signal of the cooperative mobile station calculated at Step S512 to complete the processing.

As illustrated at Steps S503 to S506 above, the replica of the received signal from the cooperative mobile station, created based on the coded bit LLRs of the data signal of the cooperative mobile station, transmitted from the cooperative base station is removed from the received signal of the anchor base station, then the data signals received from mobile stations other than the cooperative mobile station are subjected to signal detection, demodulation, decoding and other processes, whereby it is possible for the mobile stations other than cooperative mobile station to reduce reception of interference from the cooperative mobile station, caused by the time lag of the transmission timing of the cooperative mobile station, hence suppress degradation of decoding precision of the data signals from the mobile stations other than the cooperative mobile station.

Also, as illustrated at Steps S507 to S510, the replicas of the received signals received from the mobile stations other than the cooperative mobile station, prepared and calculated from the coded bit LLRs after decoding at the above Steps S503 to S506 are removed from the received signal of the anchor base station, and then signal-detection and demodulation of the data signal received from the cooperative mobile station are performed, whereby it is possible for the cooperative mobile station to reduce reception of interference from the other mobile, caused by the time lag of the transmission timing of cooperative mobile station, hence suppress degradation of decoding precision of the data signal from the cooperative mobile station.

Figure 15:
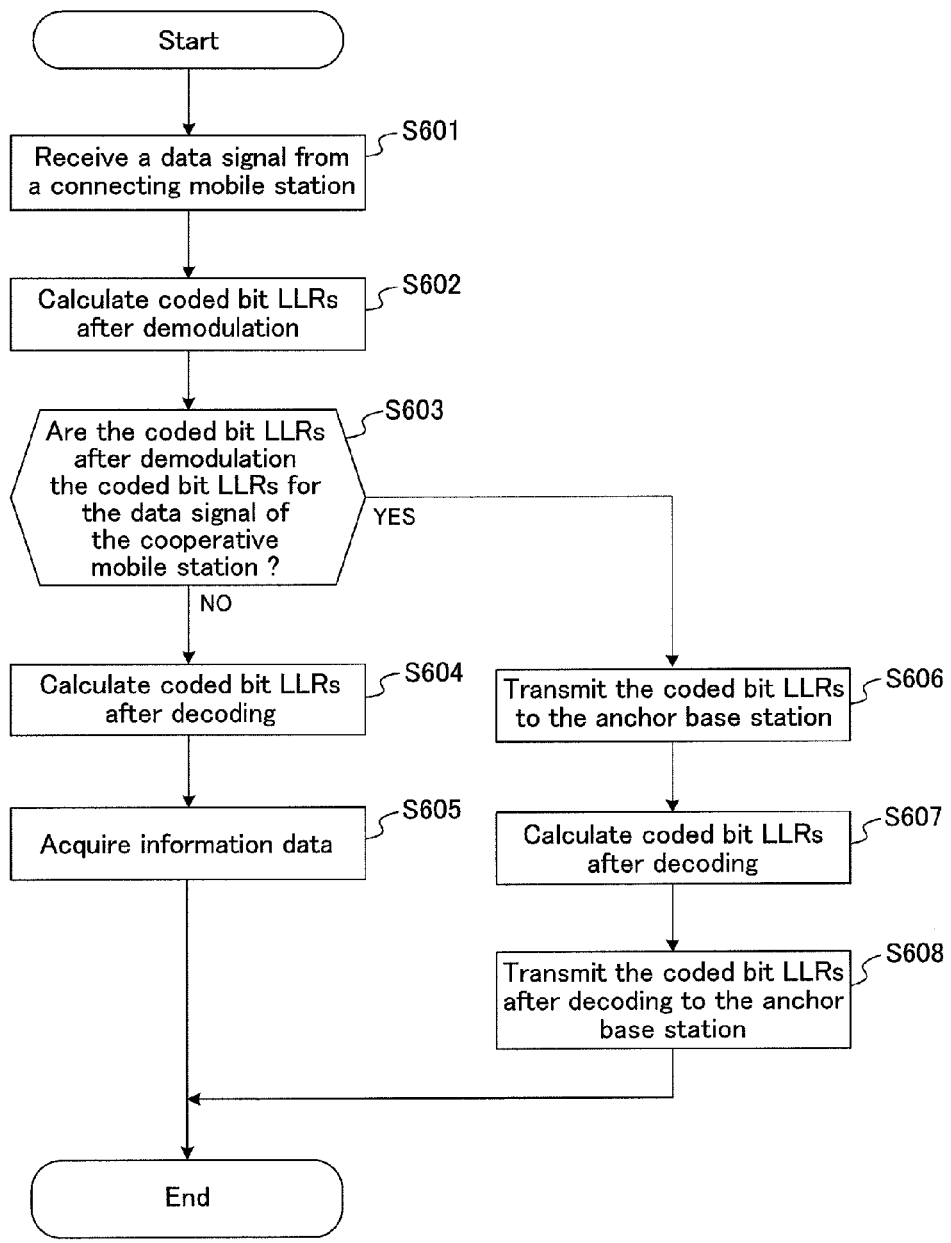
FIG. 15 is a flow chart for illustrating a process in the second embodiment.

FIG. 15 is a flow chart showing an operational example of a receiving process of the cooperative base station on the data signal received from a mobile station, in the second embodiment.

First, when receiving data signals from a plurality of mobile stations that have selected to connect to the cooperative base station per se (Step S601), the cooperative base station performs SC-CDMA signal detection, demodulation and descrambling processes on that received signal to calculate coded bit LLRs after demodulation (Step S602).

Next, it is determined whether or not the coded bit LLRs after the demodulation are the coded bit LLRs for the data signal of the cooperative mobile station (Step S603). The coded bit LLRs of the data signals of mobile stations other than the cooperative mobile station (Step S603; NO) are directly subjected to depuncturing and decoding processes to calculate coded bit LLRs after decoding (Step S604). Then, information data of the mobile stations other than the cooperative mobile station are acquired from the above coded bit LLRs after the GOU.

On the other hand, when at Step S603 the coded bit LLRs are determined to be of the data signal of cooperative mobile station (Step S603; YES), the coded bit LLRs is transmitted to the anchor base station through the interface of the upper layer (Step S606). The coded bit LLRs of the data signal of the cooperative mobile station is depunctured and decoded to calculate coded bit LLRs after decoding (Step S607). The coded bit LLRs after decoding of the cooperative mobile station is transmitted to the anchor base station through the upper layer (Step S608).

As described heretofore, when the cooperative mobile station transmits an identical data signal to a plurality of base stations, the cooperative mobile station transmits the identical data to the plurality of base stations, based on the reference timing which the cooperative base station among the data-transmitted plurality of base stations holds. The anchor base station among the multiple base stations having received the signal from the cooperative mobile station uses the coded bit LLRs of the data signal which the cooperative mobile station has transmitted to the cooperative base station when detecting the data signals from a plurality of mobile stations including the cooperative mobile station. With this arrangement, the anchor base station can mitigate characteristics degradation due to corruption of the FFT periodicity and characteristics degradation due to interference (inter block interference) between signals in the FFT duration even when the timings at which the individual mobile stations receive the data signal fall beyond the GI length.

3. The Third Embodiment

Next, the third embodiment will be described. The third embodiment will be described taking an example in which in a plurality of base stations having received data transmitted by a cooperative mobile station, and there co-exist a cooperative mobile station exceeding the GI length and mobile stations not exceeding the GI length.

Figure 16:
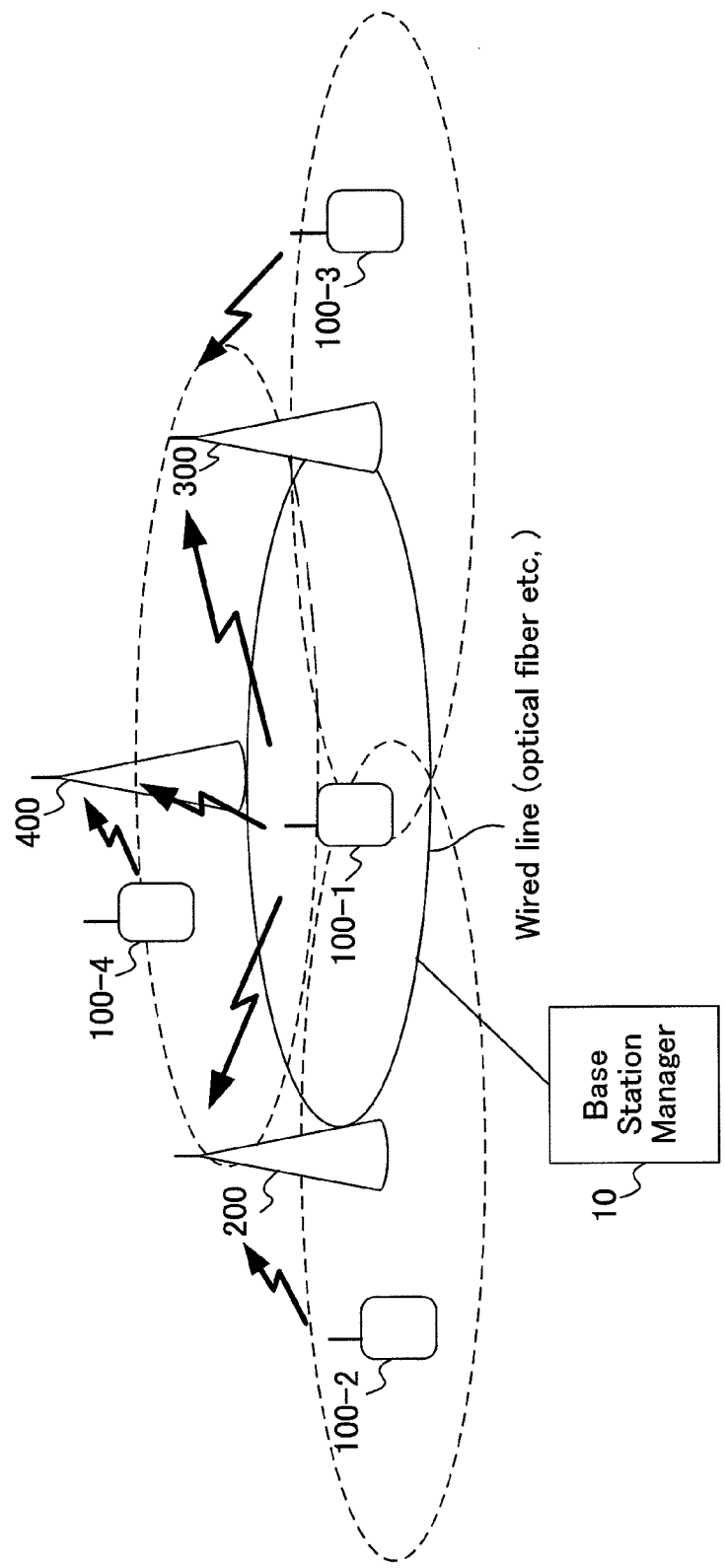
FIG. 16 is a diagram for illustrating a communication system as a whole, in the third embodiment.

FIG. 16 is a diagram showing the whole system of the third embodiment. The following description will be given taking a case where a mobile station 100-1 shown in FIG. 16 transmits an identical data signal to base station 200 and base stations 300 and 400. Here, mobile station 100-2 connects to base station 200 only, mobile station 100-3 connects to base station 300 only, and mobile station 100-4 connects to base station 400 only.

Figure 17:
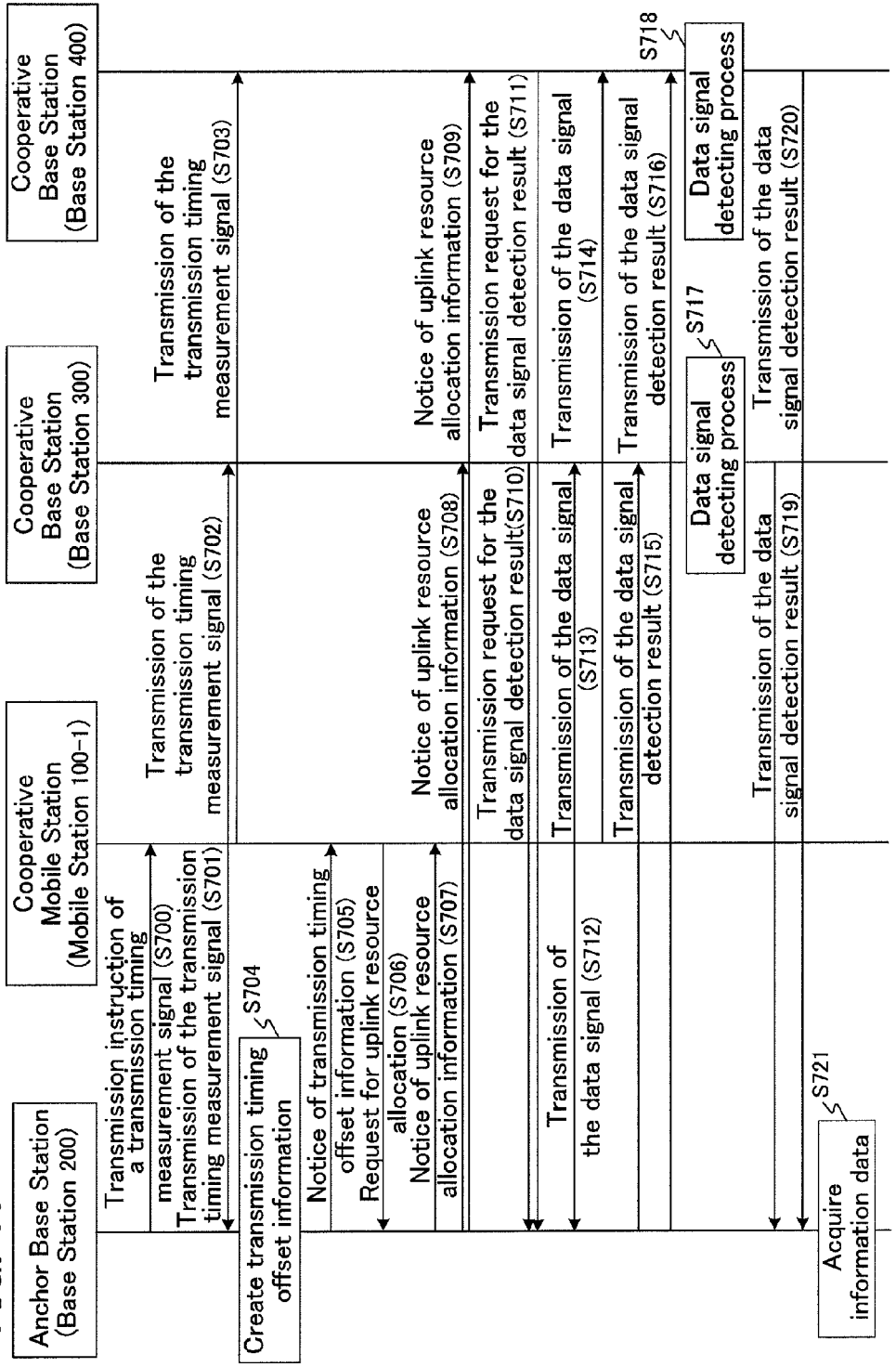
FIG. 17 is a sequence diagram for illustrating the operation in the third embodiment.

FIG. 17 is a sequence diagram showing an operational example in which when a cooperative mobile station (mobile station 100-1) transmits a data signal to the anchor base station (base station 200) and two cooperative base stations (base station 300 and base station 400) at the transmission timing based on the reference timing which the anchor base station holds and base station 300 and base station 400 receive the data signal from the cooperative mobile station at reception timings that fall beyond the GI length, information data of the cooperative mobile station is acquired from the data signals transmitted to all the base stations. In FIG. 17, each cooperative base station determines whether or not the reception timing from the cooperative mobile station falls beyond the GI length.

To begin with, the anchor base station (base station 200) transmits a control signal (e.g., Preamble Indicator for RACH in LTE) that instructs the cooperative mobile station to transmit a control signal for measuring the transmission timing (transmission timing measurement signal, e.g., random access preamble in LTE) (S700). At this time, the resource for transmitting the transmission timing measurement signal and the format of the transmission timing measurement signal (e.g., preamble sequence) are indicated.

Next, the cooperative mobile station, following the control signal that indicates transmission of the transmission timing measurement signal, transmits a transmission timing measurement signal to the anchor base station and cooperative base stations (base station 300 and base station 400) through the RACH (S701, S702 and S703).

Here, it is also possible for the cooperative mobile station to transmit a transmission timing measurement signal without regard to whether to receive a control signal that indicates transmission of the transmission timing measurement signal. In this case, the available resource and format have been informed through the PBCH from the anchor base station, so that the transmission timing measurement signal can be transmitted based on those. The anchor base station having received the transmission timing measurement signal calculates the time difference (transmission timing offset value) between the transmission timing measurement signal and the reference timing which the base station per se holds, to create transmission timing offset information. When the anchor base station receives transmission timing measurement signals from other mobile stations (mobile station 100-2 in FIG. 16) that have selected to connect to the base station per se, the anchor base station also creates transmission timing offset information on each mobile station (S704).

The anchor base station performs transmission timing offset for all the mobile stations that connect to the anchor base station such that the time difference between the transmission timing measurement signal from each mobile station and the aforementioned reference timing which the anchor base station holds falls equal to or shorter than the GI length. Here, the reference timing which the anchor base station holds is preferably the same as the reference signal each cooperative base station holds.

Next, the anchor base station notifies the transmission timing offset information to the cooperative mobile station by means of a downlink control signal (S705).

Next, the cooperative mobile station makes an uplink resource allocation request (SR: Scheduling Request) to the anchor base station, in accordance with the transmission timing notified by the transmission timing offset information (S706). For example the uplink resource allocation request may be given through the PUCCH (physical Uplink Control CHannel).

Next, the anchor base station notifies the cooperative mobile station of the uplink resource allocation information through the PDCCH or the like (S707). At the same time, the anchor base station also notifies the cooperative base stations of the resource allocation information for the cooperative mobile station (S708 and S709).

Then, base station 300, based on the transmission timing calculated from the resource allocation information for the cooperative mobile station transmitted at 5708 and the transmission timing offset value measured using the transmission timing measurement signal received at S703, determines whether or not the reception timing of the data signal received from the cooperative mobile station exceeds the GI length and makes a transmission request for the detection result of the data signal of the cooperative mobile station to the anchor base station when the reception timing exceeds the GI length (S710). It should be noted that the transmission request for the detection result of the data signal may be also made to other cooperative base stations.

Similarly, base station 400, based on the resource allocation information for the cooperative mobile station transmitted at 5709 and the transmission timing offset value measured using the transmission timing measurement signal received at 5703, determines whether or not the reception timing exceeds the GI length and makes a transmission request for the detection result of the data signal to the anchor base station when the reception timing exceeds the GI length (S711).

Next, the cooperative mobile station transmits a data signal to the anchor base station and cooperative base stations, based on the resource allocation information (S712, 713 and S714). Here, the resources used for transmission of the data signal is scheduled by another control signal so that the data signal will not collide with other signals of the anchor base station and cooperative base stations. The anchor base station performs a detecting process on the received data signal of the cooperative mobile station to obtain coded bit LLRs after decoding.

Next, the anchor base station transmits the coded bit LLRs after decoding as the detection result of the data signal to base stations 300 and 400 through the interface of the upper layer (e.g., X2 interface in LTE) (S715 and S716).

Next, base station 300 (base station 400), using the coded bit LLRs after decoding, transmitted at S715 (S716), performs a signal detecting process S717 (S718) of the data signal received at S713 (S714).

Base station 300 (base station 400) transmits the coded bit LLRs after demodulation of the data signal of the cooperative mobile station, among the data signals obtained by the above signal detecting process, to the anchor base station through the interface of the upper layer (S719 and S720). The coded bit LLRs after demodulation of the data signals of other mobile stations (e.g., mobile station 100-3 and mobile station 100-4 in FIG. 16) obtained by the signal detecting process are decoded and then decided at the upper layer to produce information data.

Finally, the anchor base station combines the coded bit LLRs after demodulation of the data signal which the anchor base station has received from the cooperative mobile station and the coded bit LLRs after demodulation of the data signal of the cooperative mobile station, transmitted from the cooperative base stations (base station 300 and base station 400) (at combiner 206 in FIG. 2) and performs a decoding process (at decoder 208 in FIG. 2) on the combined coded bit LLRs to thereby calculate the coded bit LLRs after decoding. The anchor base station acquires information data of the cooperative mobile station from the aforementioned coded bit LLRs after decoding on the upper layer (S721). It is noted that the information data of each mobile station acquired as above is transmitted on the downlink to the mobile station to which each information data is addressed. Here, instead of the coded bit LLRs after demodulation transmitted between the base stations, the coded bit LLRs after decoding or the coded bits may also be used.

Figure 18:
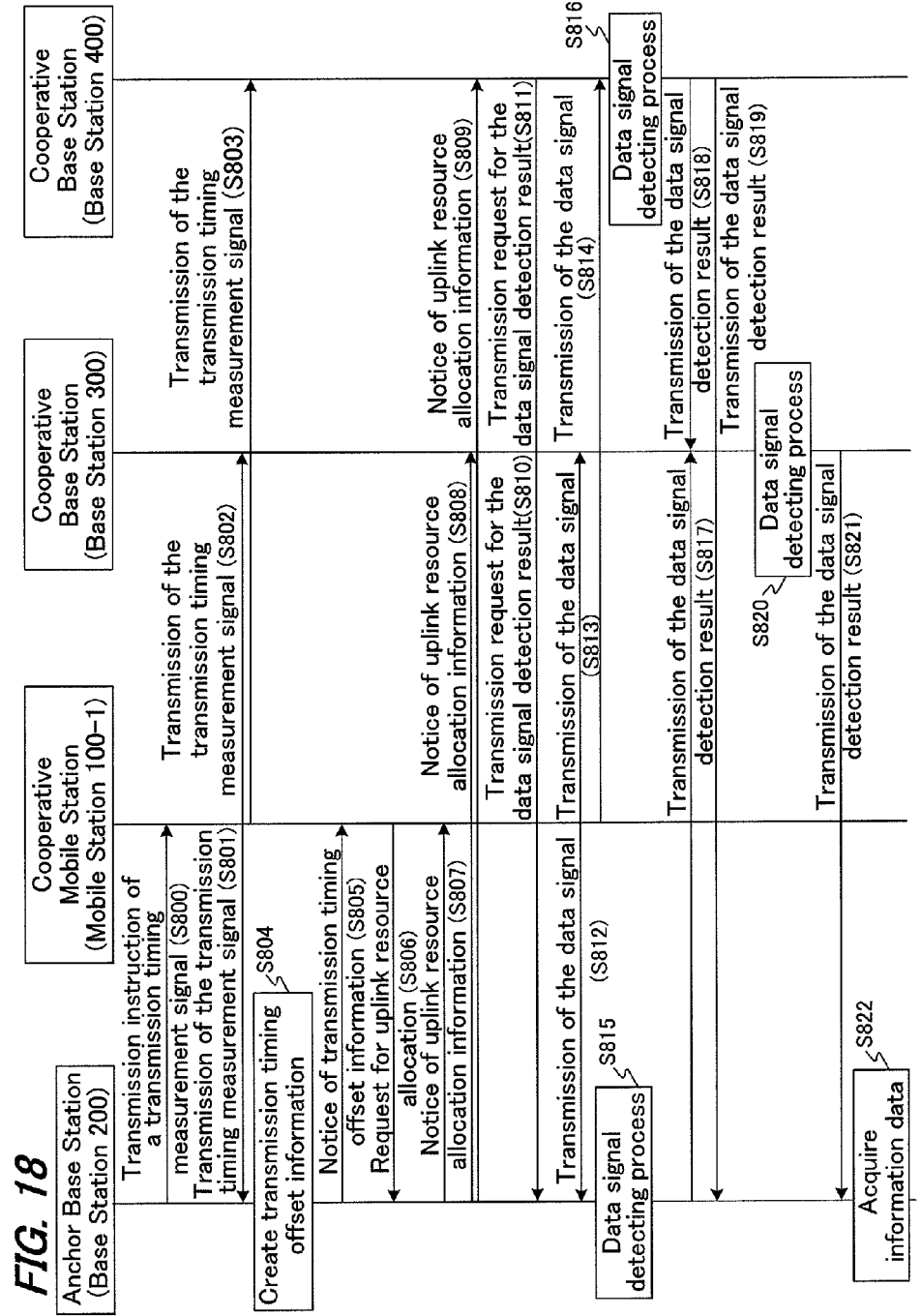
FIG. 18 is a sequence diagram for illustrating the operation in the third embodiment.

FIG. 18 is a sequence diagram showing an operational example in which when a cooperative mobile station (mobile station 100-1) transmits a data signal to the anchor base station (base station 200) and two cooperative base stations (base station 300 and base station 400) at the transmission timing based on the reference timing which the anchor base station holds, and base station 300 receives the data signal from the cooperative mobile station at a reception timing that falls beyond the GI length while base station 400 receives the data signal from the cooperative mobile station at a reception timing that falls within the GI length, information data from the cooperative mobile station is acquired from the data signals transmitted to all the base stations. Also in FIG. 18, description will be made on a case where each cooperative base station determines whether or not the reception timing from the cooperative mobile station falls beyond the GI length.

To begin with, the anchor base station (base station 200) transmits a control signal that instructs the cooperative mobile station to transmit a control signal for measuring the transmission timing (transmission timing measurement signal, e.g., random access preamble in LTE) (S800). At this time, the resource for transmitting the transmission timing measurement signal and the format of the transmission timing measurement signal are indicated.

Next, the cooperative mobile station, following the control signal that indicates transmission of the transmission timing measurement signal, transmits a transmission timing measurement signal to the anchor base station and cooperative base stations (base station 300 and base station 400) (S801, S802 and S803). For example, the transmission timing measurement signal is transmitted via the RACH.

Here, it is also possible for the cooperative mobile station to transmit a transmission timing measurement signal without regard to whether to receive a control signal that indicates transmission of the transmission timing measurement signal. In this case, the available resource and format have been informed through the PBCH and the like from the anchor base station, so that the transmission timing measurement signal can be transmitted based on those.

The anchor base station having received the transmission timing measurement signal calculates the time difference (transmission timing offset value) between the transmission timing measurement signal and the reference timing which the base station per se holds, to create transmission timing offset information (S804). When the anchor base station receives transmission timing measurement signals from other mobile stations (mobile station 100-2 in FIG. 16) that have selected to connect to the base station per se, the anchor base station also creates transmission timing offset information on each mobile station. The anchor base station performs transmission timing offset for all the mobile stations that connect to the anchor base station such that the time difference between the transmission timing measurement signal from each mobile station and the aforementioned reference timing which the anchor base station holds falls equal to or shorter than the GI length. Here, the reference timing which the anchor base station holds is preferably the same as the reference signal each cooperative base station holds.

Next, the anchor base station notifies the transmission timing offset information to the cooperative mobile station by means of a downlink control signal (S805).

Next, the cooperative mobile station makes an uplink resource allocation request to the anchor base station, in accordance with the transmission timing notified by the transmission timing offset information (S806). For example the uplink resource allocation request may be given through the PUCCH.

Next, the anchor base station notifies the cooperative mobile station of the uplink resource allocation information through the PDCCH or the like (S807). At the same time, the anchor base station also notifies the cooperative base stations of the resource allocation information for the cooperative mobile station (S808 and S809). Then, base station 300, based on the transmission timing calculated from the resource allocation information for the cooperative mobile station transmitted at S808 and the transmission timing offset value measured using the transmission timing measurement signal received at S802, determines whether or not the reception timing of the data signal received from the cooperative mobile station exceeds the GI length and performs a transmission request for the detection result of the data signal to the anchor base station and the cooperative base station when the reception timing exceeds the GI length (S810 and S811). It should be noted that the transmission request for the detection result of the data signal to the cooperative base station may be also made without considering whether or not the cooperative mobile station exceeds the GI length.

On the other hand, base station 400, based on the transmission timing calculated from the resource allocation information for the cooperative mobile stations transmitted at S809 and the transmission timing offset value measured using the transmission timing measurement signal received at S803, determines whether or not the reception timing of the data signal received from the cooperative mobile station exceeds the GI length. Since the reception timing does not exceed the GI length, no transmission request for the detection result of the data signal will not be given to the anchor base station and cooperative base station.

Next, the cooperative mobile station transmits a data signal to the anchor base station and cooperative base stations, based on the resource allocation information (S812, 813 and 814). Here, the resources used for transmission of the data signal is scheduled by another control signal so that the data signal will not collide with other signals of the anchor base station and cooperative base stations. The anchor base station and base station 400 performs a detecting process on the received data signal of the cooperative mobile station (S815 and S816) to obtain coded bit LLRs after decoding. Further, base station 400 transmits the coded bit LLRs after demodulation of the data signal of the cooperative mobile station to the anchor base station by way of an interface (e.g., X2 interface in LTE) of the upper layer (S819).

Next, the anchor base station, and the cooperative base station (base station 400) having received the data signal of the cooperative mobile station at a timing that does not exceed the GI length, each transmit the coded bit LLRs after decoding to base station 300 by way of the interface of the upper layer (S817 and S818).

Next, base station 300, using the coded bit LLRs after decoding, transmitted at S817 and S818, performs a signal detecting process of the data signal received at S813 (S820). Base station 300 transmits the coded bit LLRs after demodulation of the data signal of the cooperative mobile station, among the data signals obtained by the signal detecting process, to the anchor base station through the interface of the upper layer (S821). The coded bit LLRs of the data signals of other mobile stations (e.g., mobile station 100-3 in FIG. 16) obtained by the signal detecting process are determined by the upper layer to produce information data (S822).

Finally, the anchor base station combines the coded bit LLRs after demodulation of the data signal which the anchor base station has received from the cooperative mobile station and the coded bit LLRs after demodulation of the data signal of the cooperative mobile station, transmitted from the cooperative base stations (base station 300 and base station 400) (at combiner 206 in FIG. 2) and performs a decoding process (at decoder 208 in FIG. 2) on the combined coded bit LLRs to thereby calculate the coded bit LLRs after decoding. The anchor base station acquires information data of the cooperative mobile station from the aforementioned coded bit LLRs after decoding on the upper layer (S822). It is noted that the information data of each mobile station acquired as above is transmitted on the downlink to the mobile station to which each information data is addressed.

In the above description, determination of whether or not the reception is done at a timing beyond the GI length is performed based on the transmission timing calculated from the resource allocation information for the cooperative mobile station and the transmission timing offset value measured using the transmission timing measurement signal. However, the invention should not be limited to this as long as it is possible to determine whether or not the reception is done at a timing beyond the GI length. For example, it is also possible to make a decision based on the time lag of reception timing from the cooperative mobile station, calculated by each mobile station based on the positional information on the anchor base station, cooperative base stations and the cooperative mobile station acquired from the GPS (Global Positioning System) or the like, exchanged therebetween. As shown in FIGS. 17 and 18, the cooperative base station determines whether or not the data signal from the cooperative mobile station has been received at a timing that falls beyond the GI length, and if it exceeds the GI length, the coded bit LLRs after decoding of another base station that has received the data signal from the cooperative mobile station at a timing within the GI length are used to perform a detection process of the data signal of the cooperative mobile station.

The configuration of the cooperative mobile station in the third embodiment is the same as mobile station 100 in FIG. 1 of the first embodiment. The configuration of the anchor base station in the third embodiment is the same as anchor base station 200 in FIG. 2 of the first embodiment.

Figure 19:
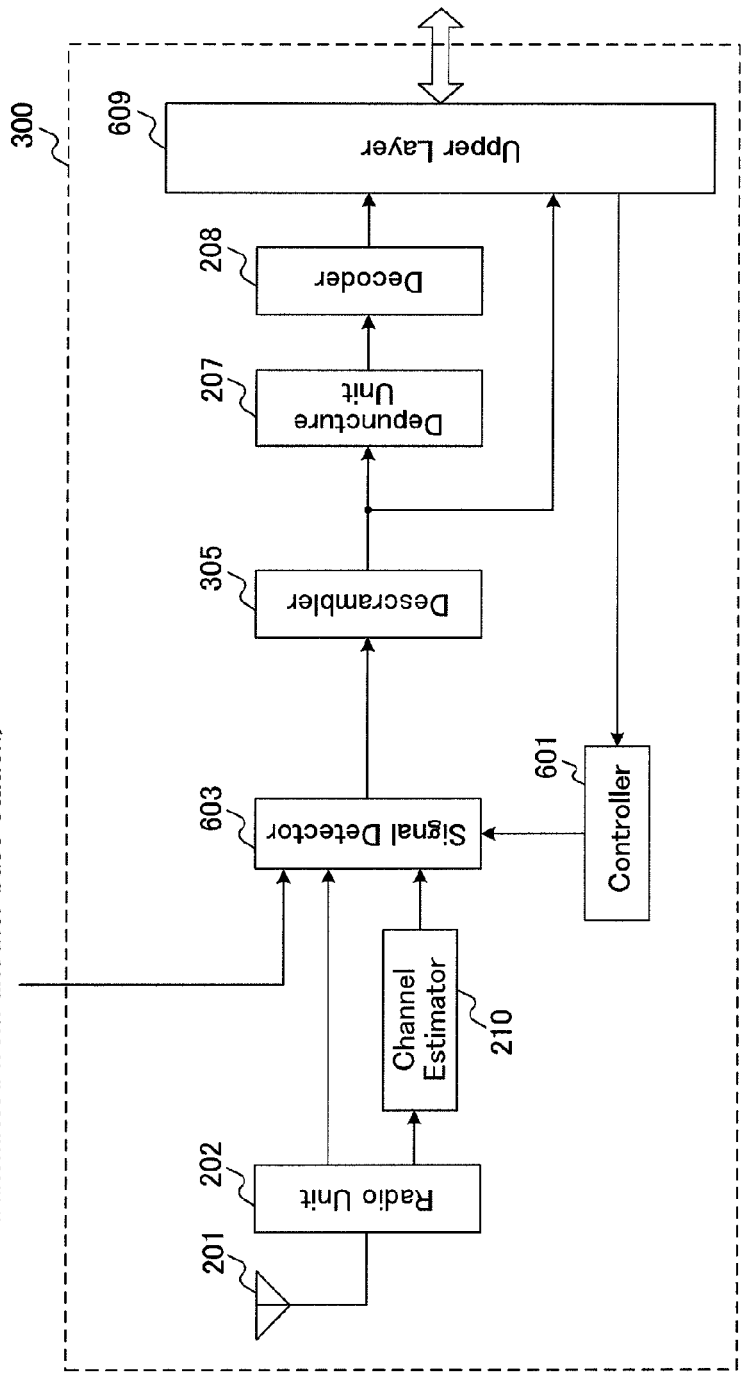
FIG. 19 is a diagram for illustrating a configuration of a base station (cooperative base station) in the third embodiment.

FIG. 19 is a schematic block diagram showing a configuration of cooperative base station (base station 300, base station 400) in the third embodiment. The cooperative base station includes a receiving antenna unit 201, a radio unit 202, a signal detector 603, a descrambler 305, a depuncture unit 207, a decoder 208, an upper layer 609, a channel estimator 210 and a controller 601. The cooperative base station of the present embodiment is different from base station 300 of the first embodiment in that a signal detector 603 is provided instead of the signal detector 303, upper layer 609 is provided instead of upper layer 309, and controller 601 is additionally provided. The components allotted with the same reference numerals as in base station 300 have the same functions as shown in the first embodiment, so that description will be given by focusing on the different components.

Upper layer 609 acquires information data on each mobile station addressed to the base station per se from the coded bit LLRs after decoding, output from decoder 208. Upper layer 609 notifies controller 601 of the transmission timing measurement signal transmitted from the cooperative mobile station and the uplink resource allocation information transmitted from the anchor base station.

Upper layer 609 transmits the coded bit LLRs after decoding of the cooperative mobile station output from decoder 208 to the anchor base station and/or cooperative base station. Upper layer 609 further transmits the coded bit LLRs after demodulation for the data signal of the cooperative mobile station output from descrambler 305 to the anchor base station.

Controller 601 measures the timing lag (transmission timing offset value for the station per se) between the reception timing of the data signal of the cooperative mobile station and the reference timing of the station per se using the transmission timing measurement signal. Further, from the uplink resource allocation information, the controller acquires the transmission timing (actual transmission timing) of the cooperative mobile station, transmitted by the transmission timing of the anchor base station. Then, from time difference between the above time lag and the actual transmission timing, the controller determines whether or not the timing at which the cooperative mobile station receives will fall beyond the GI length, and notified the determined result to signal detector 603.

Signal detector 603 has the same configuration as that of 303 of FIG. 5, but is different from signal detector 303 in that interference canceller 332 subtracts the received signal replica generated by replica generator 331, based on the determined result notified from controller 601. That is, interference canceller 332 implements subtraction of the received signal replica when it is notified from controller 601 that the reception timing at which the cooperative mobile station receives will fall beyond the GI length.

Figure 20:
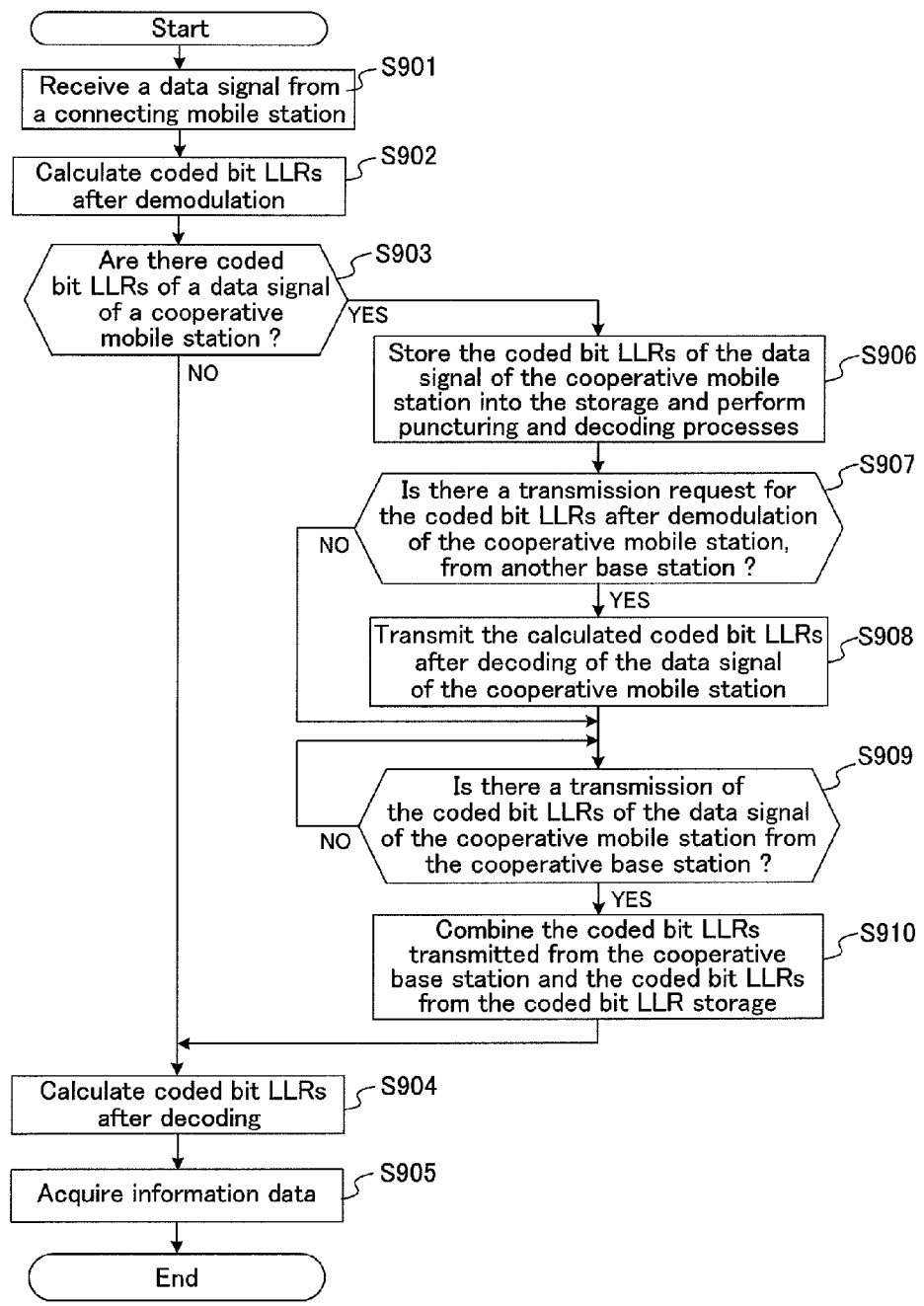
FIG. 20 is a flow chart for illustrating a process in the third embodiment.

FIG. 20 is a flow chart showing an operational example of a receiving process on the data signal which the anchor base station in the third embodiment has received from a mobile station.

First, the anchor base station receives data signals from a plurality of mobile stations that have selected to connect to the base station per se (Step S901). The received data signals also include the data signal from the cooperative mobile station. The anchor base station performs SC-FDMA signal detection, demodulation, descrambling process and the like on the received data signals and calculates coded bit LLRs after demodulation (Step S902).

Then, among the coded bit LLRs after demodulation, the coded bit LLRs of the data signals of mobile stations other than the cooperative mobile station (Step S903; NO), are subjected to depuncturing and decoding processes to calculate coded bit LLRs after decoding (Step S904). Based on the coded bit LLRs after decoding, information data on each mobile station is acquired (Step S905).

On the other hand, for the coded bit LLRs of the data signal of the cooperative mobile station (Step S903; YES) among the coded bit LLRs after demodulation, the coded bit LLRs after demodulation of the data signal of the cooperative mobile station are stored into the storage, and then the coded bit LLRs after demodulation are subjected to depuncturing and decoding processes (Step S906).

Next, when a transmission of coded bit LLRs after decoding of the cooperative mobile station is requested from another base station (Step S907; YES), the coded bit LLRs after decoding of the data signal of the cooperative mobile station calculated at Step S906 are transmitted to the cooperative base station (Step S908). When there is no transmission request (Step S907; NO), transmission of the coded bit LLRs after demodulation of the data signal of the cooperative mobile station, from the cooperative base station is waited for.

Next, the anchor base station determines whether or not there is a transmission from the cooperative base station, of coded bit LLRs of the data signal which the cooperative base station has received from the cooperative mobile station (Step S909). If there is no transmission (Step S909; NO), a transmission is waited for. When there is a transmission (Step S909; YES), the anchor base station combines the transmitted coded bit LLRs after demodulation of the data signal which the cooperative base station has received from the cooperative mobile station with the coded bit LLRs after demodulation of the data signal which the anchor base station has received from the cooperative mobile station (the coded bit LLRs stored in the coded bit LLRs storage) (Step S910). Then, the combined coded bit LLRs of the data signal of the cooperative mobile station are subjected to depuncturing and decoding processes, to thereby calculate the coded bit LLRs after decoding of the cooperative mobile station (Step S904). Finally, the coded bit LLRs after decoding of the cooperative mobile station are hard-decided to thereby produce information data on the cooperative mobile station (Step S905).

Figure 21:
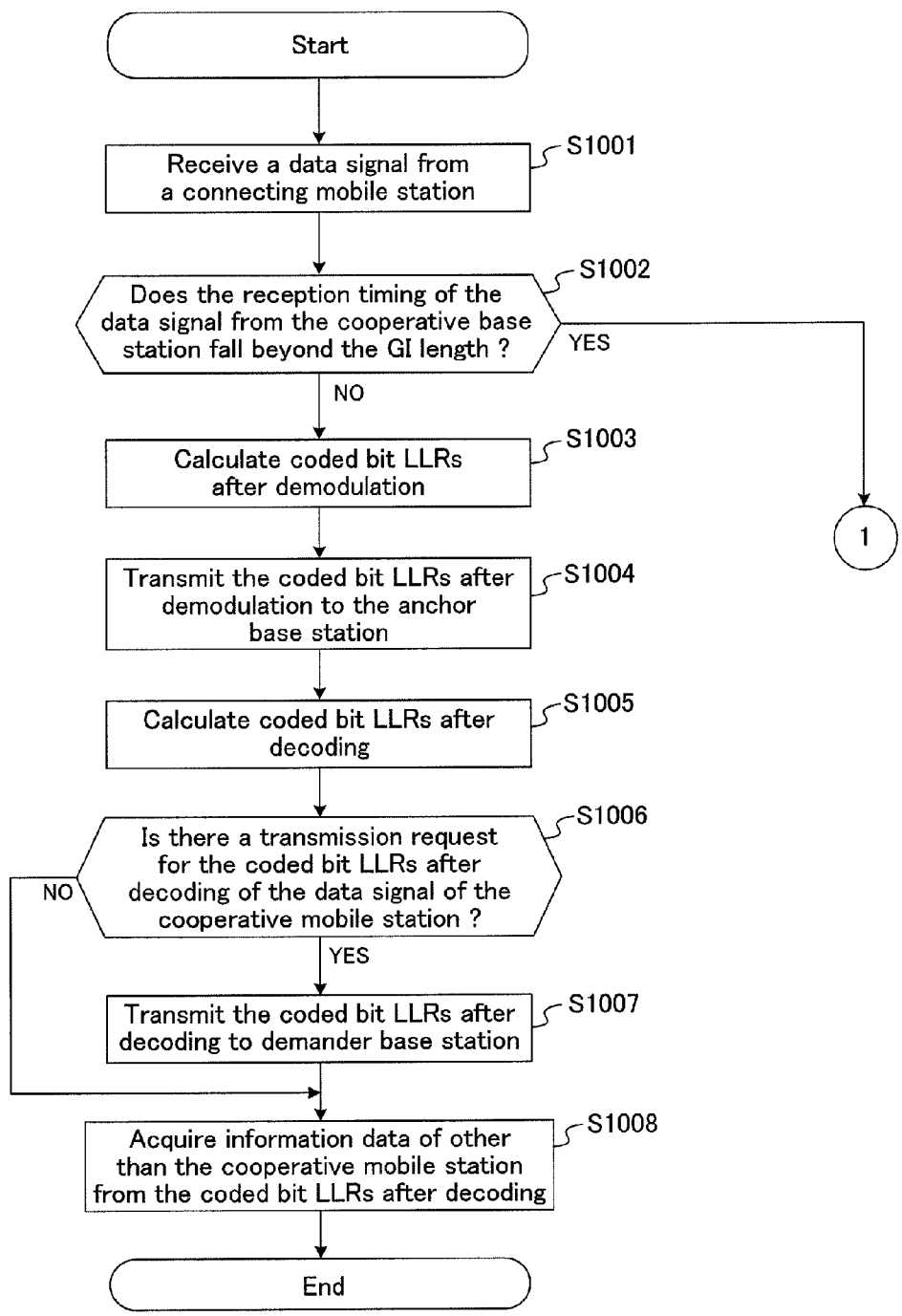
FIG. 21 is a flow chart for illustrating a process in the third embodiment.
Figure 22:
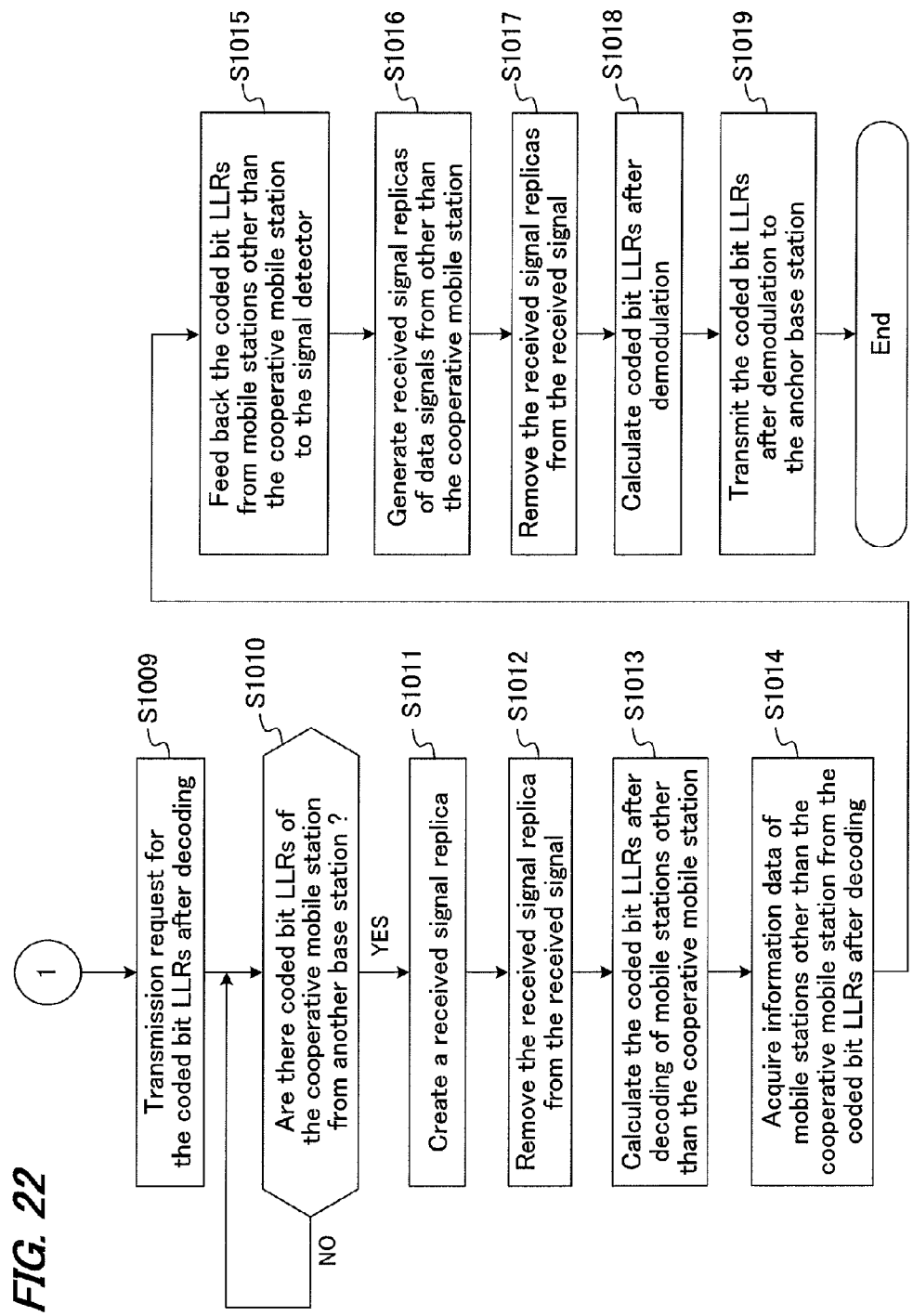
FIG. 22 is a flow chart for illustrating a process in the third embodiment.

FIGS. 21 and 22 are flow charts showing an operational example of a receiving process in the cooperative base station on the data signal received from a mobile station, in the third embodiment.

First, the cooperative base station receives data signals from a plurality of mobile stations that have selected to connect to the base station per se (Step S1001 in FIG. 21). The received data signals also include the data signal from the cooperative mobile station.

Next, the cooperative base station determines whether or not the timing at which the base station per se receives the data signal of the cooperative mobile station falls beyond the GI length, from the transmission timing measurement signal transmitted from the cooperative mobile station and the uplink resource allocation information on the cooperative mobile station, transmitted from the anchor base station (Step S1002).

When the reception timing of the data signal of the cooperative mobile station does not exceed the GI length (Step S1002; NO), the data signal received at Step S1001 is subjected to SC-FDMA signal detection, demodulation and descrambling processes to calculate coded bit LLRs after demodulation (Step S1003), and among the thus calculated coded bit LLRs after demodulation, the coded bits in association with the data signal of the cooperative mobile station are transmitted to the anchor base station (Step S1004).

Further, the coded bit LLRs after demodulation calculated at Step S1003 is descrambled, depunctured and decoded so as to calculate coded bits after decoding (Step S1005). As to the thus calculated coded bits, when there is a request of another mobile station for transmission of the coded bit LLRs of the data signal of the cooperative mobile station (Step S1006; YES), the coded bit LLRs after decoding for the data signal of the cooperative mobile station, calculated ate Step S1005 are transmitted to the requester mobile station (Step S1007). Then, information data on each mobile station other than the cooperative mobile station is obtained from the coded bit LLRs after decoding (Step S1008). On the other hand, when there is no transmission request for the coded bit LLRs at Step S1006 (Step S1006; No), information data on each mobile station other than the cooperative mobile station is obtained from the coded bit LLRs after decoding (Step S1008).

On the other hand, when the reception timing of the data signal of the cooperative mobile station exceeds the GI length (Step S1002; YES), the cooperative base station requests another base station to transmit the coded bit LLRs after decoding (Step S1009 in FIG. 22) and waits for the transmission (Step S1010). The base station to which a transmission request is given may be requested without regard to the anchor base station and another cooperative base station.

Next, as receiving a transmission of the coded bit LLRs for the data signal of the cooperative mobile station from the other base station (Step S1010; YES), the cooperative base station uses the transmitted coded bit LLRs to generate a received signal replica of the data signal of the cooperative mobile station which the cooperative base station has received (Step S1011), and removes the received signal replica from the received signal at the cooperative base station (the signal received at Step 1001) (Step S1012).

Then, at Step S1012, the data signal of the cooperative mobile station with the received signal replica removed is subjected to SC-FDMA signal detection, demodulation, descrambling, depuncturing and decoding processes to calculate coded bit LLRs of mobile stations after decoding (Step S1013). The upper layer makes a hard-decision on the coded bit LLRs after decoding to obtain information data (Step S1014). Further, when another base station requests the cooperative base station to transmit the coded bit LLRs after decoding for the cooperative mobile station, the coded bit LLRs after decoding for the data signal of the cooperative mobile station, calculated at Step S1013 can be transmitted.

The coded bit LLRs after decoding for the data signals of the mobile stations other than the cooperative mobile station, calculated at Step S1013, are fed back to the signal detector (Step S1015). The signal detector generates a received signal replicas of the received data signals from mobile stations other than the cooperative mobile station, using the feedback coded bit LLRs after decoding (Step S1016).

Next, the received signal replicas generated at Step S1016 are removed from the received signal of the cooperative base station (the signal received at Step S1001) (Step S1017). Then, the signal with the received signal replicas removed at Step S1017 is subjected to SC-FDMA signal detection, demodulation, descrambling processes so as to calculate the coded bit LLRs after demodulation for the data signal which the cooperative base station has received from the cooperative mobile station (Step S1018). The coded bit LLRs after demodulation, calculated at Step S1018 is transmitted to the anchor base station (Step S1019) to complete the processing.

Further, when a transmission of the coded bit LLRs after decoding for the cooperative mobile station to the cooperative base station is requested by another base station, the coded bit LLRs after demodulation for the data signal of the cooperative mobile station, calculated at Step S1019 are decoded so that the coded bit LLRs after decoding can be transmitted.

In FIGS. 17 and 18, description was given by taking cases where each cooperative base station determines whether or not the timing of reception from the cooperative mobile station exceeds the GI length, but the anchor base station can also do the same thing.

Figure 23:
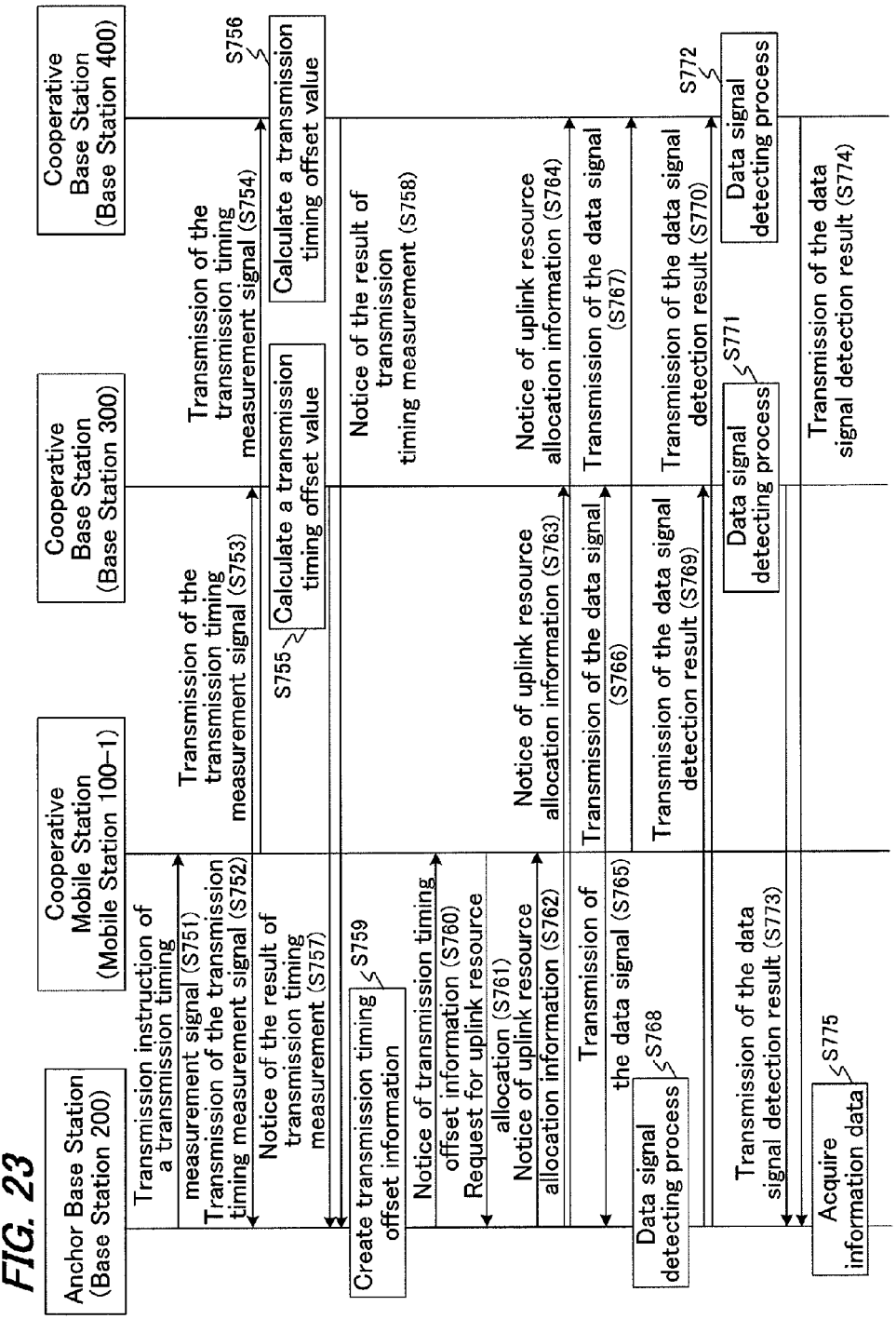
FIG. 23 is a sequence diagram for illustrating the operation in the third embodiment.
Figure 24:
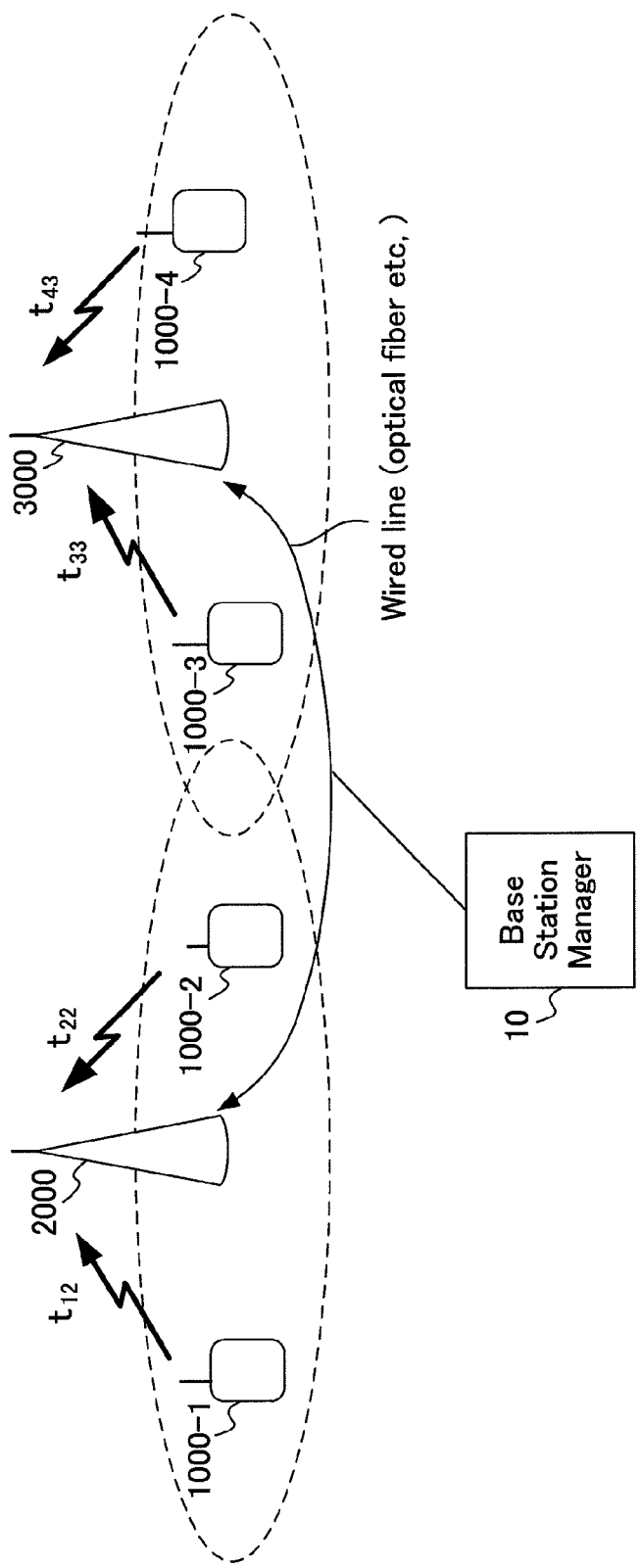
FIG. 24 is a diagram for illustrating a communication system as a whole.

FIG. 23 is a sequence diagram showing a case in which when a cooperative mobile station (mobile station 100-1) transmits a data signal to the anchor base station (base station 200) and two cooperative base stations (base station 300 and base station 400) at the transmission timing based on the reference timing which the anchor base station holds and base stations 300 and 400 receives the data signal of the cooperative mobile station at reception timings that fall beyond the GI length, the anchor base station determines whether or not the data signal of the cooperative mobile station received by the base station exceeds the GI length.

First, the anchor base station (base station 200) transmits a control signal that instructs the cooperative mobile station to transmit a control signal for measuring the transmission timing (transmission timing measurement signal) (Step S751). At this time, the resource for transmitting the transmission timing measurement signal and the format of the transmission timing measurement signal are indicated.

Next, the cooperative mobile station, following the control signal that indicates transmission of the transmission timing measurement signal, transmits a transmission timing measurement signal to the anchor base station and cooperative base stations (base station 300 and base station 400) (Steps S752, S753 and S754). For example, the transmission timing measurement signal is transmitted via the RACH.

The cooperative base station having received the transmission timing measurement signal calculates the difference of time (transmission timing offset value) between the transmission timing measurement signal and the reference timing which the base station per se holds (Steps S755 and S756) and transmits the result to the anchor base station by way of upper layer (S757 and S758).

The anchor base station having received the transmission timing measurement signal calculates the time difference between the transmission timing measurement signal and the reference timing which the base station per se holds, to create transmission timing offset information (Step S759). The anchor base station performs transmission timing offset for all the mobile stations that connect to the anchor base station such that the time difference between the transmission timing measurement signal from each mobile station and the aforementioned reference timing which the anchor base station holds falls equal to or shorter than the GI length. Further, the anchor base station determines whether or not the timing at which each cooperative base station receives the data signal of the cooperative mobile station falls beyond the GI length, based on the transmission timing offset information and the time difference (transmission timing offset value) from the reference timing transmitted from the cooperative base station, and creates timing error information. Here, the timing error information may be information that describes whether or not the reception timing falls beyond the GI length or may be information indicating the timing error.

Next, the anchor base station notifies the transmission timing offset information to the cooperative mobile station by means of a downlink control signal (Step S760). Then, the cooperative mobile station makes an uplink resource allocation request (SR: Scheduling Request) to the anchor base station, in accordance with the transmission timing notified by the transmission timing offset information (Step S761). For example, the uplink resource allocation request may be given through the PUCCH.

Next, the anchor base station notifies the cooperative mobile station of the uplink resource allocation information through the PDCCH or the like (Step S762). Further, the anchor base station notifies the cooperative base stations of the resource allocation information for the cooperative mobile station and the timing error information through the upper layer (Steps S763 and S764).

Next, the cooperative mobile station transmits a data signal to the anchor base station and cooperative base stations, based on the resource allocation information (Steps S765, 766 and 5767). Here, the resources used for transmission of the data signal are scheduled by another control signal so that the data signal will not collide with other signals of the anchor base station and cooperative base stations. The anchor base station performs a detecting process on the received data signal of the cooperative mobile station (Step S768) to obtain coded bit LLRs after decoding.

Next, the anchor base station transmits the coded bit LLRs after decoding to base stations 300 and 400 through the interface of the upper layer (Steps S769 and S770).

Next, base station 300 (base station 400), using the coded bit LLRs after decoding, transmitted at Step S769 (S770), performs a signal detecting process of the data signal received at Step S763 (S764) (Steps 771 and S772).

Base station 300 (base station 400) transmits the coded bit LLRs after demodulation of the data signal of the cooperative mobile station, among the data signals obtained by the signal detecting process, to the anchor base station through the interface of the upper layer (Steps S773 and S774). The coded bit LLRs after decoding of the data signals of other mobile stations (e.g., mobile station 100-3 and mobile station 100-4 in FIG. 16) obtained by the above signal detecting process are decided at the upper layer to produce information data.

Finally, the anchor base station combines the coded bit LLRs after demodulation of the data signal which the anchor base station has received from the cooperative mobile station and the coded bit LLRs after demodulation of the data signal of the cooperative mobile station, transmitted from the cooperative base stations (base station 300 and base station 400) and performs a decoding process on the combined coded bit LLRs to thereby calculate the coded bit LLRs after decoding for the data signal of the cooperative mobile station. The anchor base station acquires information data of the cooperative mobile station from the aforementioned coded bit LLRs after decoding on the upper layer (Step S775). It is noted that the information data of each mobile station acquired as above is transmitted on the downlink to the mobile station to which each information data is addressed. Here, instead of the coded bit LLRs after demodulation transmitted between the base stations, the coded bit LLRs after decoding or the coded bits may also be used.

Here, in FIG. 23, the anchor base station gives notice of the timing error information together with the resource allocation information (Steps S763 and S764), but this is not limited as long as it can be notified. For example, the timing error information may be notified together with the transmission of the detection result to the data signal (Steps S769 and S770).

FIG. 23 can be applied to a case where there coexist a cooperative base station that receives the data signal from a cooperative mobile station shown in FIG. 18 at a timing that falls beyond the GI length and a cooperative base station that receives at a timing that falls within the GI length.

When the anchor base station determines whether or not the reception timing from the cooperative mobile station falls beyond the GI length, the anchor base station 200 in FIG. 2 needs to include controller 601 of FIG. 19. That is, based on the transmission timing offset value of the cooperative base station transmitted via the upper layer and the transmission timing offset value calculated by the anchor base station itself, controller 601 provided for the anchor base station inputs control information (timing error information) that indicates whether or not the data signal of the cooperative mobile station which each cooperative base station receives will be received at a timing falling beyond the GI length, to control signal generator 213.

It is also possible to select a base station that performs cooperative communication, based on the timing lag of the cooperative mobile station relative to each base station. For example, a base station that can be improved in characteristics by applying the present invention may be selected to perform cooperative communication while the other base stations will not be used for cooperative communication. Further, in conformity with this, the transmission power of the cooperative mobile station may be controlled.

Further, instead of transmitting a transmission timing measurement signal to the anchor base station and cooperative base stations simultaneously, the cooperative mobile station may transmit the signal at different timings. In either case, it is preferred that the anchor base station has previously notified the cooperative base stations of the resource and format of the transmission timing measurement signal which the cooperative mobile station transmits. When transmissions are performed at different timings, the resource and format of the transmission timing measurement signal may be different from each other. Further, the transmission timing measurement signal may be transmitted to different cooperative base station, simultaneously or at different timings, after correcting the transmission timing based on the transmission timing offset information notified by the anchor base station. Further, the cooperative mobile station may transmit positional information acquired from the GPS (Global Positioning System) or the reference signal for positional measurement transmitted from each base station, to the anchor base station to achieve the object. Moreover, the cooperative mobile station may measure the difference in reception timing at the cooperative mobile station based on the synchronization signal or the like transmitted from each base station and transmit that information to the anchor base station, to thereby achieve the object.

As described above, in the third embodiment, in a plurality of cooperative base stations having received data transmitted from a cooperative mobile station, when there coexist cooperative base stations with a delay in excess of the GI length and cooperative base stations without a delay in excess of the GI length, a cooperative base station with a delay in excess of the GI length makes a request for the decoded result of the data signal of the cooperative mobile station to a base station (including the anchor base station) without a delay in excess of the GI length and performs a signal detection process and demodulation process on the data signal received by the base station per se by using the decoded result transmitted in response to the request. The cooperative base station having a delay in excess of the GI length can also perform a demodulating process on the data signal received by the base station per se, using the coded bit LLRs after decoding calculated by another cooperative base station having a delay in excess of the GI length, or the decoded bit LLRs calculated by signal detection based on the decoded result of another base station.

Accordingly, the cooperative mobile station having a delay in excess of the GI length can perform a signal detecting process using the decoded result of the data signal with good accuracy among the data signals which the cooperative mobile station transmitted to different base stations, so that it is possible to perform highly accurate detection being little affected by interference due to collapse of the periodicity of the FFT and interference between signals in the FFT duration (inter block interference). As a result, it is possible to obtain information data of the cooperative mobile station with high precision even when there exists a base station having a reception timing that falls beyond the GI length among the plurality of base stations to which the cooperative mobile station made a transmission.

Though the present embodiment was described taking a case where the transmission timing of the cooperative mobile station is set based on the reference timing of the anchor base station, it can be also set based on the reference timing of the cooperative mobile station as shown in the second embodiment.

Though description of the first to third embodiments is made taking cases where SC-FDMA transmission is used, the present invention is not limited to this. The invention can be applied to transmission schemes in which GIs (Guard Intervals) are added such as, for example, OFDM, OFDMA (Orthogonal Frequency Division Multiple Access), MC-CDMA (Multi Carrier-Code Division Multiple Access), and the like.

In the first to third embodiments, the base station that performs signal detection on only the data signal received by the station per se is called the first base station, and the base station that performs signal detection on the data signal received by the station per se using the detection result of the data signal at another base station is called the second base station. Specifically, in the first embodiment, the anchor base station (base station 200 in the first embodiment) corresponds to the first base station, and the cooperative base station (base station 300 in the first embodiment) to the second base station. In the second embodiment, the anchor base station (base station 200 in the second embodiment) corresponds to the second base station, and the cooperative base station (base station 300 in the second embodiment) to the first base station. In the third embodiment, the anchor base station (base station 200 in the third embodiment) corresponds to the first base station, and the cooperative base stations (base stations 300 and 400 in the third embodiment) to the second base station.

DESCRIPTION OF REFERENCE NUMERALS 100 mobile station
101 upper layer
102 encoder
103 puncture unit
104 scrambler
105 modulator
106 DFT unit
107 mapping unit
108 IFFT unit
109 GI inserting unit
110, 114 radio unit
111 transmitting antenna unit
112 reference signal generator
113 control signal detector
115 receiving antenna unit
200 base station
201 receiving antenna unit
202 radio unit
203 signal detector
204 demodulator
205 descrambler
206 combiner
207 depuncture unit
208 decoder
209 upper layer
211 transmission antenna unit
212 radio unit
213 control signal generator
214 storage
231 GI remover
232 FFT unit
233 filter unit
234 IDFT unit
300 base station
303 signal detector 305 descrambler
309 upper layer
331 replica generator
332 interference canceller
400 base station
403 signal detector
406 combiner
408 decoder
411 storage
414 code bit LLR storage
509 upper layer
601 controller
603 signal detector
609 upper layer

The invention claimed is:

1. A communication system comprising a mobile station that transmits a data signal and a plurality of base stations receiving the data signal transmitted by the mobile station, the communication system including: as the base stations, at least, one first base station having a first signal detector detecting a first data signal that was generated by coding information bits transmitted from the mobile station; and, at least, one second base station having a second signal detector that detects a data signal received by the second base station, using a detection result which the first base station has detected, wherein the second signal detector detects a second data signal other than the data signal transmitted by the mobile station by removing the first data signal from data signals received by the second base station, the second signal detector detects a third data signal transmitted by the mobile station among the data signals received by the second base station, by using the detected second data signal, and the first data signal and the third data signal are signals generated by coding the identical information bits.

2. The communication system according to claim 1, wherein the second base station further comprises a decoder that performs a decoding process on the detection result which the second signal detector has detected from the data signal, and the second signal detector, using a result of the decoding process, performs detection of the third data signal transmitted by the mobile station.

3. The communication system according to claim 1, wherein the first base station further comprises a combiner that combines a result which the first signal detector has detected from the first data signal and a result which the second signal detector has detected from the third data signal.

4. The communication system according to claim 2, wherein the second base station further comprises a combiner that combines a result which the first signal detector has detected from the first data signal and a result which the second signal detector has detected from the third data signal, and the decoder performs the decoding process on an output signal of the combiner.

5. The communication system according to claim 1, wherein the mobile station transmits a transmission timing measurement signal for measuring a timing at which the mobile station will transmit the data signal, to the first base station and the second base station.

6. The communication system according to claim 1, wherein the first base station includes:

a control signal generator that generates offset information on a timing at which the mobile station transmits the data signal, based on a reference timing which the first base station holds; and
a radio unit configured to transmit a control signal including the offset information with respect to the timing, and, the mobile station transmits the data signal in accordance with a resource allocation information based on the transmission timing offset information notified by the control signal.

7. The communication system according to claim 6, wherein the second base station determines whether or not the timing at which the data signal transmitted by the mobile station using the resource allocation information falls beyond Guard Interval (GI) length.

8. The communication system according to claim 6, wherein the second base station requests the first base station to transmit the detected result of the first data signal transmitted by the mobile station.

9. The communication system according to claim 1, wherein the second base station includes:

a control signal generator that generates offset information on a timing at which the mobile station transmits the data signal, based on a reference timing which the first base station holds; and
a radio unit configured to transmit a control signal including the offset information with respect to the timing, and, the mobile station transmits the data signal in accordance with a resource allocation information based on the transmission timing offset information notified by the control signal.

10. The communication system according to claim 9, wherein the second base station determines whether or not the timing at which the data signal transmitted by the mobile station using the resource allocation information falls beyond Guard Interval (GI) length.

11. The communication system according to claim 1, wherein the first base station further comprises:

a decoder that performs a decoding process on a result detected by the first signal detector; and
an upper layer that transmits the result of the decoding process by the decoder, or the result of the decoding process on the first data signal transmitted by the mobile station, to the second base station.

12. The communication system according to claim 1, wherein the second signal detector further includes:

a replica generator that generates a received signal replica of the data signal of the mobile station which the second base station has received, from the detection result which the first base station has detected from the data signal transmitted by the mobile station; and,
an interference canceller that subtracts the received signal replica from the data signal.

13. The communication system according to claim 2, wherein the second signal detector further includes:

a replica generator that generates a received signal replica of the data signal of communication apparatus other than the mobile station, received by the second base station, from the result of the decoding process of the decoder; and,
an interference canceller that subtracts the received signal replicas from the data signal.

14. A communication method for use in a communication system comprising a mobile station that transmits a data signal and at least first and second base stations receiving the data signal transmitted by the mobile station, the communication method comprising the steps of:

a first step of detecting, by the first base station, a first data signal that was generated by coding information bits transmitted from the mobile station;

a second step of detecting, by the second base station, a second data signal other than the data signal transmitted by the mobile station by removing the first data signal from data signals received by the second base station, by using a result detected in the first step; and a third step of detecting a third data signal transmitted by the mobile station among the data signals received by the second base station, by using a detected result of the second data signal, wherein the first data signal and the third data signal are signals generated by coding the identical information bits.

15. A second base station connected to a communication system comprising a mobile station that transmits a data signal and a first base station configured to detect the data signal transmitted by the mobile station, the second base station comprising:

a second signal detector that detects the data signal received by the second base station, using a result which the first base station has detected a first data signal that was generated by coding information bits transmitted from the mobile station, wherein the second signal detector detects a second data signal other than the data signal transmitted by the mobile station by removing the first data signal from data signals received by the second base station, the second signal detector detects a third data signal transmitted by the mobile station among the data signals received by the second base station, by using the detected result of the second data signal, and the first data signal and the third data signal are signals generated by coding the identical information bits.

16. The second base station according to claim 15, further comprising:

a decoder configured to perform a decoding process on the detection result which the second signal detector has detected from the data signal, wherein the second signal detector, using a result of the decoding process, performs detection of the third data signal transmitted by the mobile station.

17. The second base station according to claim 16, further comprising:

a combiner configured to combine a result which the first signal detector has detected from the first data signal and a result which the second signal detector has detected from the third data signal, wherein the decoder performs the decoding process on an output signal of the combiner.

18. The second base station according to claim 15, further comprising:

a replica generator configured to generate a received signal replica of the data signal of the mobile station which the second station has received, from the detection result which the first base station has detected the first data signal; and, an interference canceller configured to subtract the received signal replica from the data signal received by the second base station.

19. The second base station according to claim 16, further comprising:

a replica generator configured to generate a received signal replica of the second data signal from the result of the decoding process of the decoder; and an interference canceller configured to subtract the received signal replicas from the data signal received by the second base station.

* * * * *